US012801731B2

(12) United States Patent
Azmoodeh et al.

(10) Patent No.: US 12,801,731 B2
(45) Date of Patent: Nov. 17, 2026

(54) METHOD AND SYSTEM FOR DETERMINATION OF OUT-OF-DISTRIBUTION SAMPLES AND ATTACK SURFACES FOR ARTIFICIAL NEURAL NETWORKS

(71) Applicant: UNIVERSITY OF GUELPH, Guelph (CA)

(72) Inventors: Amin Azmoodeh, Guelph (CA); Ali Dehghantanha, Guelph (CA)

(73) Assignee: UNIVERSITY OF GUELPH, Guelph (CA)

( * ) Notice: Subject to any disclaimer, the term of this patent is extended or adjusted under 35 U.S.C. 154(b) by 99 days.

(21) Appl. No.: 18/403,269

(22) Filed: Jan. 3, 2024

(65) Prior Publication Data

US 2024/0256660 A1 Aug. 1, 2024

Related U.S. Application Data

(60) Provisional application No. 63/478,532, filed on Jan. 5, 2023.

(51) Int. Cl.
*H04L 9/00* (2022.01)
*G06F 21/55* (2013.01)

(52) U.S. Cl.
CPC .................................. *G06F 21/554* (2013.01)

(58) Field of Classification Search
CPC ..................................................... G06F 21/554
(Continued)

(56) References Cited

U.S. PATENT DOCUMENTS 10,296,832 B1 * 5/2019 Segev ................... G06F 16/283
11,297,083 B1 * 4/2022 Kuppa ................ H04L 63/1458
(Continued)

OTHER PUBLICATIONS

Bitterwolf, Julian , et al., "Certifiably Adversarially Robust Detection of Out-of-Distribution Data", ArXiv, 2020, /abs/2007.08473. Accessed Feb. 6, 2024. https://doi.org/10.48550/arXiv.2007.08473.
(Continued)

*Primary Examiner* — Christopher J Brown
(74) *Attorney, Agent, or Firm* — Marc Lampert; Bhole IP Law

(57) ABSTRACT

There is provided systems and methods for counteracting an adversarial attack on an artificial neural network by determining out-of-distribution samples. One method including: receiving training data for the artificial neural network including a plurality of in-distribution samples in an input space; embedding the training data in the input space into a lower-dimensional embedded space; receiving one or more inputted samples and embedding the one or more inputted samples into the lower-dimensional embedded space; determining a score for each of the one or more inputted samples by determining a distance from each inputted sample to a distribution of the training data in the embedded space; classifying whether each of the one or more inputted samples is out-of-distribution by determining whether the score is greater than a predetermined distance from the distribution of the training data in the embedded space; and outputting the classification of each of the one or more inputted samples.

20 Claims, 29 Drawing Sheets

(58) Field of Classification Search
USPC .......................................................... 726/22
See application file for complete search history.

(56) References Cited

U.S. PATENT DOCUMENTS

| | | | | |
|---|---|---|---|---|
| 2019/0098039 | A1* | 3/2019 | Gates | G16H 50/20 |
| 2019/0273509 | A1* | 9/2019 | Elkind | G06F 21/562 |
| 2020/0252803 | A1* | 8/2020 | Shah | G06N 20/20 |
| 2020/0311557 | A1* | 10/2020 | Jin | G06V 10/454 |
| 2021/0241113 | A1* | 8/2021 | Finn | G06V 10/764 |
| 2022/0004935 | A1* | 1/2022 | Lakshmanan | G06N 20/20 |
| 2022/0044543 | A1* | 2/2022 | Kottegoda | G08B 21/18 |
| 2023/0145002 | A1* | 5/2023 | Darby | G06F 18/217 726/22 |
| 2024/0032877 | A1* | 2/2024 | Liu | A61B 6/541 |

OTHER PUBLICATIONS

Carlini, Nicholas , et al., "Towards Evaluating the Robustness of Neural Networks", 2017 IEEE Symposium on Security and Privacy (SP), San Jose, CA, USA, 2017, pp. 39-57, doi: 10.1109/SP.2017.49.

Chen, Jiefeng , et al., "ATOM: Robustifying Out-of-distribution Detection Using Outlier Mining", ArXiv, 2020, /abs/2006.15207. Accessed Feb. 6, 2024. https://doi.org/10.48550/arXiv.2007.08473.

Chen, Jiefeng , et al., "Robust Out-of-distribution Detection for Neural Networks", ArXiv, 2020, /abs/2003.09711. Accessed Feb. 6, 2024. https://doi.org/10.48550/arXiv.2003.09711.

Gopinath, Divya, et al., "DeepSafe: A Data-driven Approach for Checking Adversarial Robustness in Neural Networks", ArXiv, 2017, /abs/1710.00486. Accessed Feb. 6, 2024. https://doi.org/10.48550/arXiv.1710.00486.

Guo, Jianmin , et al., "DLFuzz: Differential Fuzzing Testing of Deep Learning Systems", ArXiv, 2018, https://doi.org/10.1145/3236024.3264835. Accessed Feb. 6, 2024. https://doi.org/10.48550/arXiv.2007.08473.

Hendrycks, Dan , et al., "A Baseline for Detecting Misclassified and Out-of-Distribution Examples in Neural Networks", ArXiv, 2016, /abs/1610.02136. Accessed Feb. 6, 2024. https://doi.org/10.48550/arXiv.1610.02136.

Hendrycks, Dan , et al., "Deep Anomaly Detection with Outlier Exposure", ArXiv, 2018, /abs/1812.04606. Accessed Feb. 6, 2024. https://doi.org/10.48550/arXiv.1812.04606.

Hendrycks, Dan , et al., "Using Pre-Training Can Improve Model Robustness and Uncertainty", ArXiv, 2019, /abs/1901.09960. Accessed Feb. 6, 2024. https://doi.org/10.48550/arXiv.1901.09960.

Lee, Kimin , et al., "A Simple Unified Framework for Detecting Out-of-Distribution Samples and Adversarial Attacks", ArXiv, 2018, /abs/1807.03888. Accessed Feb. 6, 2024. https://doi.org/10.48550/arXiv.1807.03888.

Ma, Chen , et al., "Simulating Unknown Target Models for Query-Efficient Black-box Attacks", ArXiv, 2020, /abs/2009.00960. Accessed Feb. 6, 2024. https://doi.org/10.48550/arXiv.2009.00960.

* cited by examiner (a) ResNet-CIFAR-10 (L=4,CS=100%)
(b) ResNet-CIFAR-1 (L=6,CS=100%)
(c) ResNet-CIFAR-100 (L=45,CS=96.7%)

(d) ResNet-CIFAR-100 (L=50,CS=99.9%)
(e) ResNet-SVHN (L=0,CS=99.9%)
(f) ResNet-SVHN (L=1,CS=100%)

(g) DenseNet-CIFAR-10 (L=4,CS=100%)
(h) DenseNet-CIFAR-10 (L=6,CS=100%)
(i) DenseNet-CIFAR-100 (L=33,CS=99.8%)

(j) DenseNet-CIFAR-100 (L=78,CS=100%)
(k) DenseNet-SVHN (L=4,CS=99.9%)
(l) DenseNet-SVHN (L=6,CS=100%)

400th Layer for ID samples
DenseNet trained on CIFAR-10

400th Layer for ID samples
DenseNet trained on SVHN

180th Layer for ID samples
ResNet trained on CIFAR-10

180th Layer for ID samples
ResNet trained on SVHN

400th Layer for OOD samples
DenseNet trained on CIFAR-10

400th Layer for OOD samples
DenseNet trained on SVHN

180th Layer for OOD samples
ResNet trained on CIFAR-10

180th Layer for OOD samples
ResNet trained on SVHN

METHOD AND SYSTEM FOR DETERMINATION OF OUT-OF-DISTRIBUTION SAMPLES AND ATTACK SURFACES FOR ARTIFICIAL NEURAL NETWORKS

FIELD OF THE INVENTION

The following relates generally to attack prevention and detection for machine learning models, and more specifically, to a method and system for determination of out-of-distribution samples and attack surfaces for artificial neural networks.

BACKGROUND OF THE INVENTION

Deep learning (DL) approaches are possibly the most widely adopted subset of machine learning (ML) models, partly due to their ability to outperform classical ML algorithms in a variety of tasks; including object recognition, malware detection, financial predictions, and fraud analysis. However, the widespread adoption of DL in safety critical systems is not without complications, particularly in terms of the security, safety, and trustworthiness of DL-enabled solutions. Various aspects of DL play a role in an assumed safety of using such approaches; such as robustness, fairness, and privacy.

SUMMARY OF THE INVENTION

In an aspect, there is provided a computer-implemented method for counteracting an adversarial attack on an artificial neural network by determining out-of-distribution samples, the method comprising: receiving training data for the artificial neural network comprising a plurality of in-distribution samples in an input space; embedding the training data in the input space into a lower-dimensional embedded space; receiving one or more inputted samples and embedding the one or more inputted samples into the lower-dimensional embedded space; determining a score for each of the one or more inputted samples by determining a distance from each inputted sample to a distribution of the training data in the embedded space; classifying whether each of the one or more inputted samples is out-of-distribution by determining whether the score is greater than a predetermined distance from the distribution of the training data in the embedded space; and outputting the classification of each of the one or more inputted samples.

In a particular case of the method, determining the score comprises performing Expectation Maximization (EM).

In another case of the method, the score comprises a weighted confidence score.

In yet another case of the method, the method further comprising optimizing the input space by determining areas of the input space vulnerable to out-of-distribution samples using the weighted confidence score.

In yet another case of the method, performing the optimization to identify out-of-distribution areas comprises performing Particle Swarm Optimization.

In yet another case of the method, embedding the training data in the input space into the lower-dimensional embedded space comprises using a manifold embedding.

In yet another case of the method, the manifold embedding comprises one or more of Isometric Mapping ("Isomap") and Locally Linear Embedding ("LLE").

In another aspect, there is provided a system for counteracting an adversarial attack on an artificial neural network by determining out-of-distribution samples, the system comprising a processing unit in communication with a data storage to receive stored instructions to execute: an input module to receive training data for the artificial neural network comprising a plurality of in-distribution samples in an input space and to receive one or more inputted samples; an embedding module to embed the training data in the input space into a lower-dimensional embedded space and embed the one or more inputted samples into the lower-dimensional embedded space; a scoring module to determine a score for each of the one or more inputted samples by determining a distance from each inputted sample to a distribution of the training data in the embedded space, and to classify whether each of the one or more inputted samples is out-of-distribution by determining whether the score is greater than a predetermined distance from the distribution of the training data in the embedded space; and an output module to output the classification of each of the one or more inputted samples.

In a particular case of the system, determining the score comprises performing Expectation Maximization (EM).

In another case of the system, the score comprises a weighted confidence score.

In yet another case of the system, the system further optimizes the input space by determining areas of the input space vulnerable to out-of-distribution samples using the weighted confidence score.

In yet another case of the system, performing the optimization to identify out-of-distribution areas comprises performing Particle Swarm Optimization.

In yet another case of the system, embedding the training data in the input space into the lower-dimensional embedded space comprises using a manifold embedding.

In yet another case of the system, the manifold embedding comprises one or more of Isometric Mapping ("Isomap") and Locally Linear Embedding ("LLE").

In another aspect, there is provided a computer-implemented method for counteracting an adversarial attack on an artificial neural network by determining out-of-distribution samples, the method comprising: receiving an input sample; passing the input sample through the artificial neural network to retrieve outputs from a plurality of layers of the artificial neural network; passing the outputs of the layers of the artificial neural network to one or more first-stage classifiers to predict similarity of the outputs to a learned activity pattern for in-distribution samples from a training dataset, the first-stage classifiers outputting a sequence of labels and a sequence of probabilities; passing the sequence of labels and the sequence of probabilities to one or more second-stage classifiers to determine a class output label and a probability output label; and comparing the prediction of the artificial neural network for the input sample to the class output label and the probability output label to determine whether the sample is out-of-distribution, and where the predictions are the same, outputting a classification of the sample as in-distribution, and otherwise, outputting a classification of the sample as out-of-distribution.

In a particular case of the method, the one or more second-stage classifiers comprise sequence pattern classifiers.

In another case of the method, the artificial neural network comprises a random forest classifier.

In yet another case of the method, the learned activity patterns comprise sequences in the training dataset.

In yet another case of the method, the sequence of labels comprises a classification of learned labels for each in-distribution sample and associated true class label in the training dataset, and wherein the sequence of probabilities comprises a learned probability for sequences certainty of classification and the associated true class label.

In yet another case of the method, the artificial neural network comprises a set of local classifiers for each layer in the artificial neural network.

Other aspects and features according to the present application will become apparent to those ordinarily skilled in the art upon review of the following description of embodiments of the invention in conjunction with the accompanying figures.

BRIEF DESCRIPTION OF THE DRAWINGS

Reference will now be made to the accompanying drawings which show, by way of example only, embodiments of the invention, and how they may be carried into effect, and in which.

Like reference numerals indicated like or corresponding elements in the drawings.

DETAILED DESCRIPTION OF THE EMBODIMENTS

Figure 1:
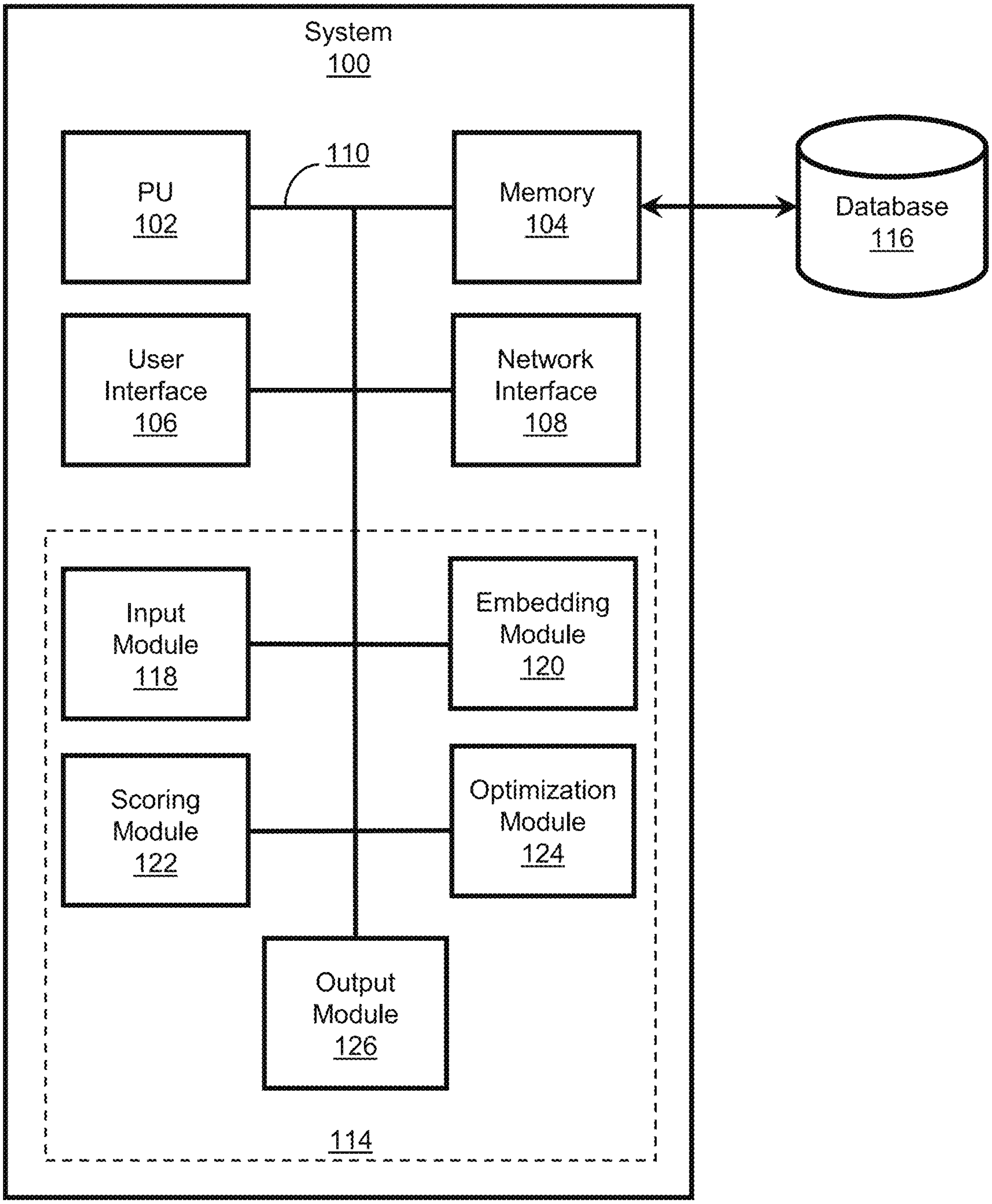
FIG. 1 is a schematic diagram of a system for determination of out-of-distribution samples for artificial neural networks, according to an embodiment.

Embodiments will now be described with reference to the figures. For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include cache, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors; for example, on central processing units and/or graphical processing units. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

The following relates generally to attack prevention and detection for machine learning models, and more specifically, to a method and system for determination of out-of-distribution samples and attack surfaces for artificial neural networks.

Figure 5:
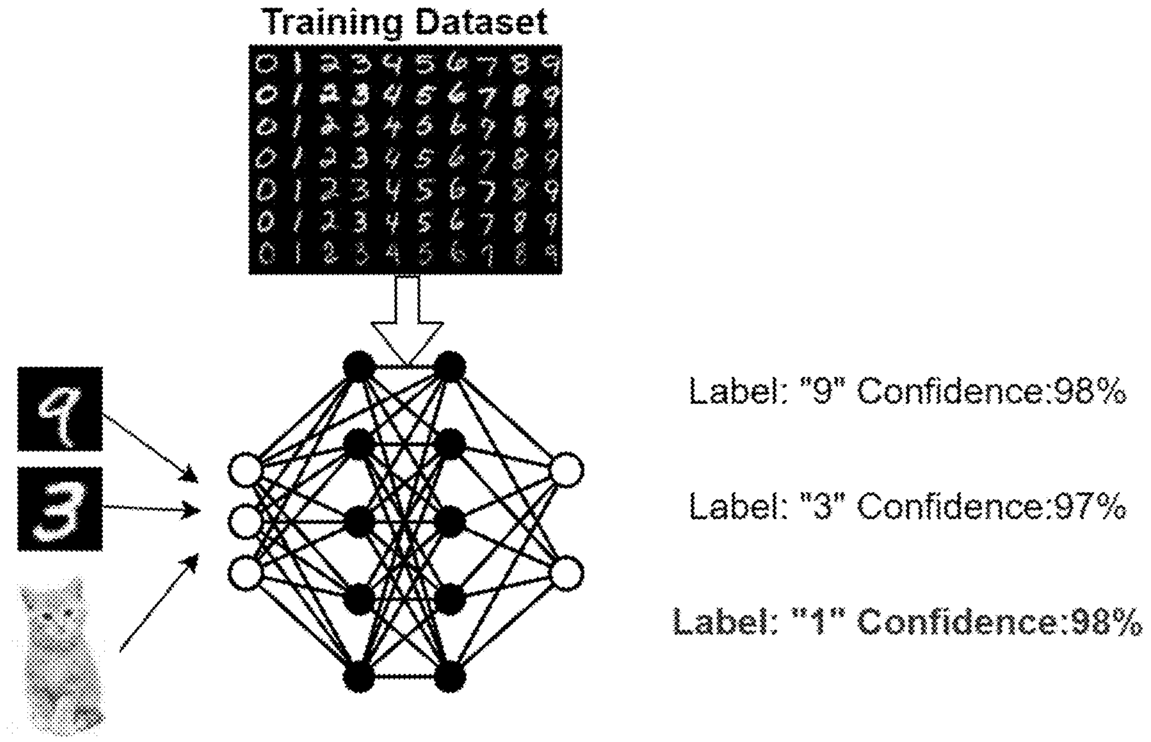
FIG. 5 illustrates a typical DCNN model trained with a Modified National Institute of Standards and Technology (MNIST) dataset and that generates confidence scores for a cat image as input.

Deep convolutional neural networks (DCNNs) are among widely used deep learning (DL) models, especially in computer vision. A DCNN is generally a fully connected network of nodes (neurons) trained to adjust the weights of nodes' connections and minimize the network's output loss. Predominantly and within a test (inference) time, a typical DCNN model is expected to deal with input samples that are similar to its training data. However, in the real world, a trained DCNN may encounter inputs unlike anything that it has been trained with. In-Distribution (ID) samples refer to a DCNN model input drawn or generated from the model's training data. In contrast, Out-of-Distribution (OOD) refers to samples that are not comparable with ID samples. It is expected that a DCNN model would offer a low confidence score to an OOD sample. However, it is not uncommon for a DCNN model to assign a high confidence score even to an OOD sample. For example, see FIG. 5 that illustrates a typical DCNN model trained with the Modified National Institute of Standards and Technology (MNIST) dataset and which generates confidence scores for a cat image as input. These OOD samples should produce low confidence outputs, but unexpectedly, produce high confidence outputs. Such mischaracterization of the OOD samples represents a critical attack surface of a given DCNN.

DCNN models' vulnerability to OOD samples elicits serious concerns for trustworthiness and robustness of these models in real-world applications. For example, the desirable performance of DCNN models have resulted in cyber-security experts encouraging their use to tackle different problems, such as in malware detection. However, the susceptibility of DCNN models to OOD inputs becomes a significant barrier for the wider adoption of these technologies in cybersecurity. There are various approaches to detect (and/or reject) OOD inputs to enhance reliability of DCNN models. For example, generating lower confidence scores to OOD samples, i.e., using Mahalanobis distance or geometric transformation of input data. However, such approaches importantly do not identify an attack surface of DCNN models to OOD samples.

The present embodiments provide an approach that explores an input space of a DCNN model using evolutionary search and identifies OOD samples that generate a high confidence score (i.e., attack surface of the DCNN model). The present embodiments can interact with a DCNN model as a black-box; hence, does not require DCNN architecture or internal parameters. Accordingly, the present embodiments provide a generalizable approach for identifying the attack surface of different DCNN models.

DCNN models are generally discriminative classifiers that split an input space (i.e., training data) into regions associated to different class labels. However, this could lead to over-generalization of input space that makes DCNN models vulnerable to OOD samples. Ideally, a DCNN model should divide its input space into regions with different data distributions representing ID samples which are separated from OOD sample. However, defining appropriate decision boundaries between ID and OOD regions is not a substantially difficult task considering, generally, the complex n-dimensional input space of DCNN models. This is further complicated when an adversary intentionally tries to develop OOD samples that can potentially fall into the ID boundaries of the target DCNN model input space.

A DCNN trained with ID data is expected to reject OOD samples that have a determined confidence score below a specific threshold. Consider a given multi-class dataset $DS_{ID\text{-}train}=\{(X_i, y_i)|i=1, \ldots, n\}$ and $X_i \in \mathbb{R}^n$ and $y_i \in \{c_1, \ldots, c_k\}$. A DCNN is trained by $DS_{ID\text{-}train}$ during training time and during test, operational, and/or inference time; which accepts inputs such as $X_{ID}$ drawn from $DS_{ID\text{-}train}$ data. Moreover, $X_{OOD}$ denotes data that does not belong to $DS_{ID\text{-}train}$ distribution(s), which can be denoted as the $c_{k+1}$ class label.

For a given DCNN model, $CNN(X)=(conf_1, \ldots, conf_k)$, where $conf_i$ is the DCNN's confidence score for $i^{th}$ class. The objective is to train the model such that it correctly recognizes a class of ID samples and separates them from OOD samples, as shown in Equation (1), where δ is the threshold to decide the inputted sample's class label. KL referes to Kullback-Leibler divergence, which is a statistical measurement to calculate similarities between two distributions of data. Moreover $$\left[\frac{1}{k}, \ldots, \frac{1}{k}\right]$$

indicates uniform distribution for the k class labels at the DCNN's output. In addition, $$KL\left([conf_1, \ldots, conf_k], \left[\frac{1}{k}, \ldots, \frac{1}{k}\right]\right) = 1$$

implies that DCNN model's confidence scores are identical. For instance and for k=4 the model's output for an OOD sample is expected to be $$\left[\frac{1}{4}, \frac{1}{4}, \frac{1}{4}, \frac{1}{4}\right].$$

the operating system and programs, including computer-executable instructions for implementing the operating system and modules, as well as any data used by these services. Additional stored data can be stored in a database 116, such as the data in the databases described herein (adversarial samples database, adversarial signatures database). During operation of the system 100, the operating system, the modules, and the related data may be retrieved from the memory 104 to facilitate execution.

$$\hat{y} = \begin{cases} \text{argmax}_k DCNN(X) & \text{if } conf_t \geq \delta \text{ when } (t \in \{1, \ldots, k\}) \\ KL\left([conf_1, \ldots, conf_k], \left[\frac{1}{k}, \ldots, \frac{1}{k}\right]\right) = 0 & \text{otherwise} \end{cases} \quad (1)$$

KL-divergence is generally used as a criterion for OOD detection to train robust models against OOD samples. These models are generally trained with outputs of ID samples and then try to detect OOD samples by modifying the model's pipeline or by improving the model's decision boundaries. Particularly, boundaries that are further from ID inputs, while still assigning highly confident labels to those areas. Previous approaches generally could only assign ID (accept) or OOD (reject) labels to each input samples. In contrast, the present embodiments provide an approach to identify attack surfaces of a given DCNN model as a set of $\{(x_{OOD_i}, \text{confidence}_i)\}$ within a DCNN model's input space. Concurrently, users of the DCNN are able to select OOD samples that bypass the model's prediction with a higher confidence score than the threshold.

Figure 2:
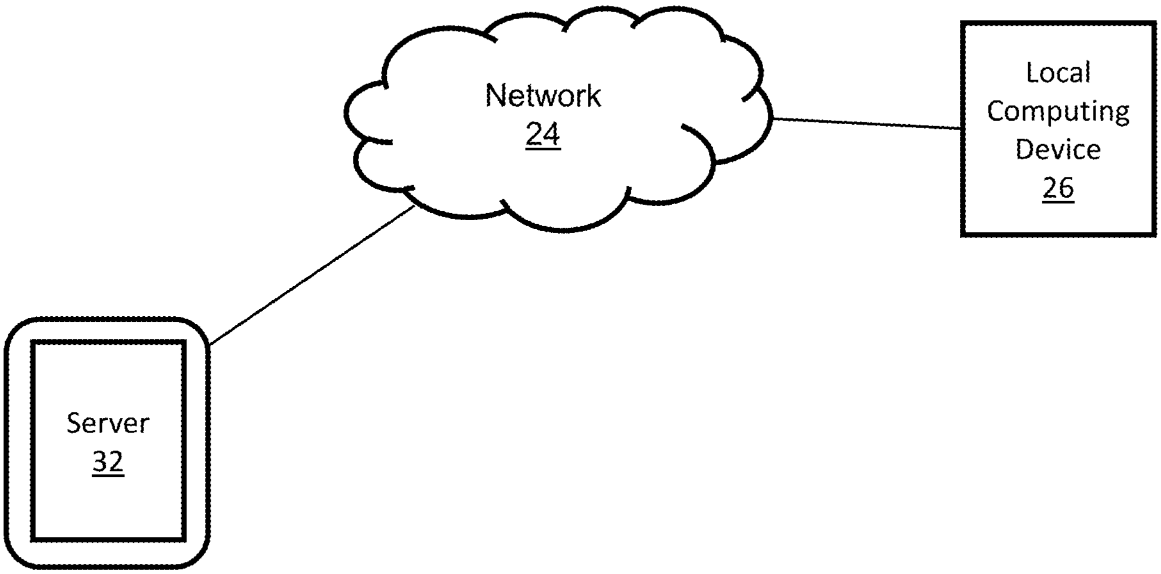
FIG. 2 is a schematic diagram of an exemplary operating environment for the system of FIG. 1.

Referring now to FIG. 1, a system 100 for determination of out-of-distribution samples for artificial neural networks, in accordance with an embodiment, is shown. In this embodiment, the system 100 is run on a local computing device (such as local computing device 26 in FIG. 2). In further embodiments, the local computing device 26 can have access to content (e.g., the DCNN model) located on a server (32 in FIG. 2) over a network, such as the internet (network 24 in FIG. 2). In further embodiments, the system 100 can be run on any suitable computing device; for example, on the server (32 in FIG. 2).

In some embodiments, the components of the system 100 are stored by and executed on a single computer system. In other embodiments, the components of the system 100 are distributed among two or more computer systems that may be locally or remotely distributed.

FIG. 1 shows various physical and logical components of an embodiment of the system 100. As shown, the system 100 has a number of physical and logical components, including a processing unit ("PU") 102 (comprising one or more processors), memory 104, a user interface 106, a network interface 108, non-volatile storage 112, and a local bus 110 enabling PU 102 to communicate with the other components. The PU 102 can comprise, for example, a central processing unit (CPU) and/or a graphical processing unit (GPU). PU 102 executes an operating system, and various modules, as described below in greater detail. The memory 104 provides relatively responsive storage to the PU 102. The user interface 106 enables an administrator or user to provide input via an input device, for example a keyboard and mouse. The user interface 106 can also output information to output devices to the user, such as a display and/or speakers. The network interface 108 permits communication with other systems, such as other computing devices and servers remotely located from the system 100, such as for a typical cloud-based access model. The memory 104 stores In an embodiment, the system 100 further includes a number of functional/conceptual modules 114 that can be executed on the PU 102; for example, an input module 118, an embedding module 120, a scoring module 122, an optimization module 124, and an output module 126. In some cases, the functions and/or operations of the modules can be combined or executed on other modules.

Figure 3:
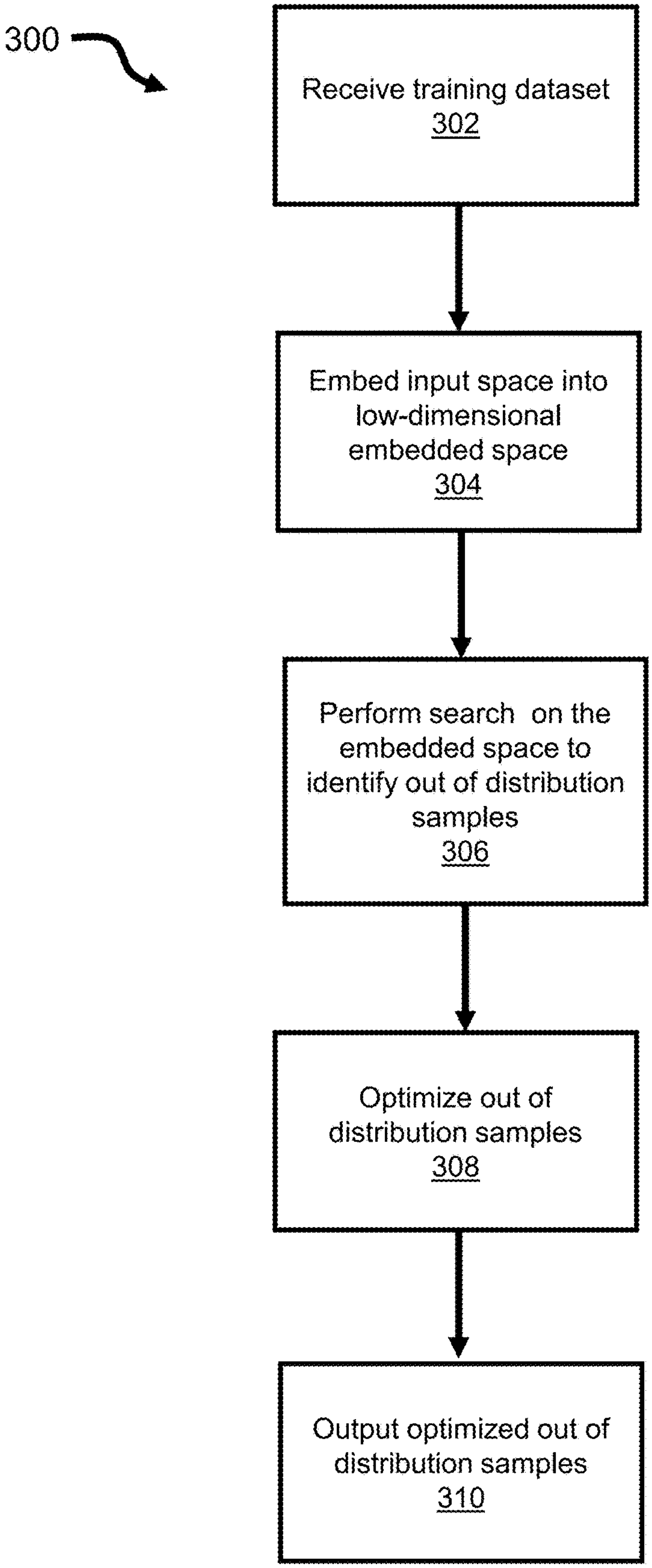
FIG. 3 is a flowchart of a method for determination of out-of-distribution samples for artificial neural networks, according to an embodiment.

FIG. 3 illustrates a flowchart diagram of a method 300 for determination of out-of-distribution samples for artificial neural networks, according to an embodiment. At block 302, the input module 118 receives a training dataset comprising an input space for a DCNN model from the database 116, the user interface 106, and/or the network interface 108. At block 304, the embedding module 120 embeds the DCNN model input space into a low-dimensional embedded space to distinguish ID samples from OOD samples. At block 306, the scoring module 122 performs a search (for example, using evolutionary search algorithms) to explore the DCNN model's input space to identify OOD samples that are further than a predetermined distance from the training dataset's embedded space. Any suitable distance measurement approach can be used, for example, Euclidean distance. Advantageously, this identification can be performed even where the DCNN model generates high confidence scores for those samples. At block 308, the optimization module 124 optimizes identified OOD samples to identify out-of-distribution areas in the input space based on the combination of their distance to embedded space and a weighted confidence score. At block 310, the output module 126 outputs the identified out-of-distribution areas to the database 116, the user interface 106, and/or the network interface 108.

In this way, in an embodiment of the method 300, the system 100 can counteract an adversarial attack on the artificial neural network by determining whether inputted samples are out-of-distribution. In such embodiment, the input module 118 can receive training data for the artificial neural network comprising a plurality of in-distribution samples in the input space and the embedding module 120 can embed the training data in the input space into a lower-dimensional embedded space. The input module 118 can then receive one or more inputted samples in the input space and the embedding module 120 can embed the one or more inputted samples into the lower-dimensional embedded space. The scoring module 122 can determine a score for each of the one or more inputted samples by determining a distance from each inputted sample to a distribution of the training data in the lower-dimensional embedded space. The scoring module 122 can classify whether each of the one or more inputted samples is out-of-distribution by determining whether the score is greater than a predetermined distance from the distribution of the training data in the lower-dimensional embedded space. The output module 126 can then output the classification of each of the one or more inputted samples to the database 116, the user interface 106, and/or the network interface 108.

Figure 4:
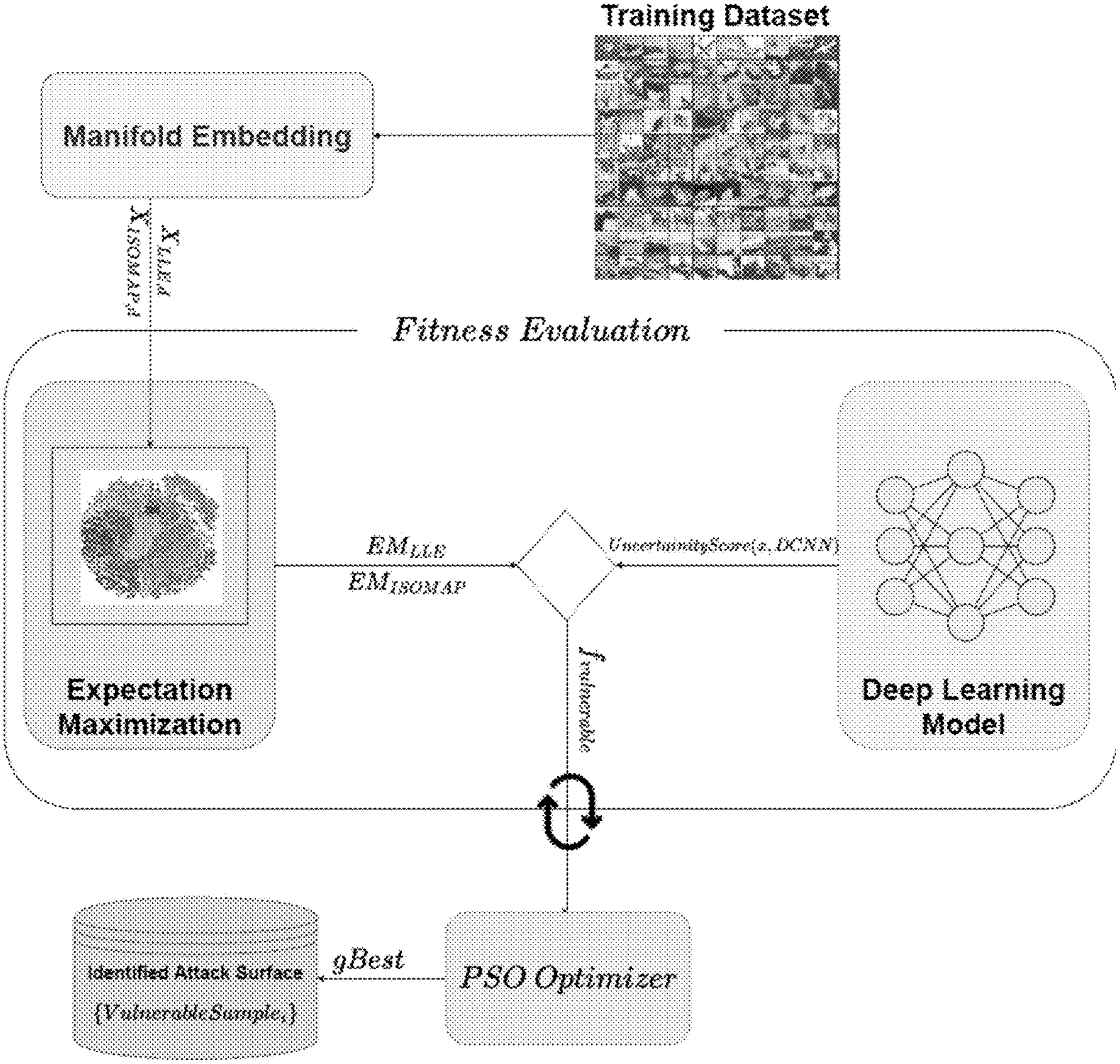
FIG. 4 illustrates an example conceptual overview of the method of FIG. 3 implemented by the system of FIG. 1.

FIG. 4 illustrates an example conceptual overview of the method 300 implemented by the system 100. Advantageously, the method 300 can be used to identify an attack surface of the DCNN for counteracting adversarial attacks on the artificial neural network. In an example, a typical DCNN model accepts an n-layer image as input; having dimension n*image height*image width. This vast input space transmutes the attack surface exploration into a sparse and complex task. Advantageously, the embedding module 120 can use a manifold embedding to transform the problem of identifying OOD samples into a low-dimensional area with a more compact distribution of ID samples. Embedding the space makes the attack surface exploration faster and its compact structure reduces the curse of dimensionality in calculating the distance in the sparse space. In particular examples, two manifold embedding techniques can be used, Isometric Mapping ("Isomap") and Locally Linear Embedding ("LLE"); however, in further cases, other suitable dimensionality reducing embedding approaches can be used.

Isomap is a nonlinear approach for reducing the dimensionality of data. It can be used to explore a DCNN's input space to find a new lower-dimensional embedding for its inputted data that preserves geodesic distances among all samples. Isomap considers the sample's k neighborhood for each sample $X_i \in \{X_1, \ldots, X_N\}$. Then, a graph of $X_i$s is constructed based on the identified neighborhood. Using the graph $X_i$s is particularly advantageous because such graphs are generally not vulnerable to timing attacks. An algorithm, such as Dijkstrato, can be used to find the shortest distance between all points in the embedded input space. A decomposition matrix can be determined to transform D-dimensional samples into a manifold of size d, which preserves pairwise calculated shortest paths (distances) between all samples in the embedded space. Isomap's computational complexity is $O[D \log(k)\ N \log(N)]+O[N^2(k+\log(N))]+O[dN^2]$ in which N, k, D, d denote number of training samples, nearest neighbors, size of input space and output's dimension, respectively.

Locally Linear Embedding (LLE) is a dimensionality reduction approach that generates a lower-dimensional projection of training samples. At the same time, the distance between local neighbors are preserved in a new manifold embedding of the data. For each sample, X_i∈{X_1, . . . , X_N}, the sample's k neighborhood is determined. A weighted aggregation on the identified neighbors is performed to find local neighborhood weights, W, in the embedded space by minimizing the cost function shown using Equations (2) and (3).

$$E(W)=\sum_{i=1}^{N}\left|X_i-\sum_{j=1}^{k}W_{i,j}Xj\right|^2 \text{ while } \sum_{k}^{j}W_{i,j}=1 \quad (2)$$

A new d-dimensional space Y is constructed by minimizing following cost function:

$$C(Y)=\sum_{i=1}^{N}\left|Y_i-\sum_{j=1}^{k}W_{i,j}Yj\right|^2 \quad (3)$$

The computational complexity of LLE is $O[D \log(k)N \log(N)]+O[N^2(k+\log(N))]+O[dN^2]$, which N, k, D, d denote number of training samples, nearest neighbors, size of input space and output's dimension, respectively.

In general, LLE is more efficient when compared to Isomap in terms of computational complexity. While LLE and ISOMAP embed the input space differently, in some cases, a combination of both can be used by the embedding module 120 for fitness evaluation to provide more insights about OOD areas in the embedded space. In addition, it illustrates an ability of the system 100 to utilize different metrics for detecting OOD samples and to explore the attack surface based on those metrics.

After embedding the ID samples from the training dataset into the lower-dimensional manifold, the scoring module 122 uses the embedded space to assign a score for inputted samples that represents the distance of the sample from ID samples and the DCNN model confidence error for that sample.

In some cases, the scoring module 122 can perform scoring using Expectation Maximization (EM); which is an iterative statistical approach to cluster inputted data and to fit K Gaussian distributions on those data. EM is an unsupervised approach that accepts input data $x_1, \ldots, x_n$ and K (where K is set as the number of class labels within ID samples). EM includes two main steps:

E-Step: For i=1, . . . , n and k=1, . . . , K, the EM algorithm calculates:

$$\phi_i(k)=\frac{\pi_k \mathcal{N}(x_i \mid \mu_k, \Sigma_k)}{\Sigma_j \pi_j \mathcal{N}(x_i \mid \mu_j, \Sigma_j)}$$

M-Step: For each Gaussian model k=1, . . . , K, EM calculates $$n_k=\sum_{i=1}^{n}\phi_i(k).$$

the EM parameters are updated as $$\pi_k=\frac{n_k}{n} \text{ and } \mu_k=\frac{1}{n_k}\sum_{i=1}^{n}\phi_i(k)x_i \text{ and } \Sigma_k=\frac{1}{n_k}\sum_{i=1}^{n}\phi_i(k)(x_i-\mu_k)(x_i-\mu_k)^T.$$

Figure 6:
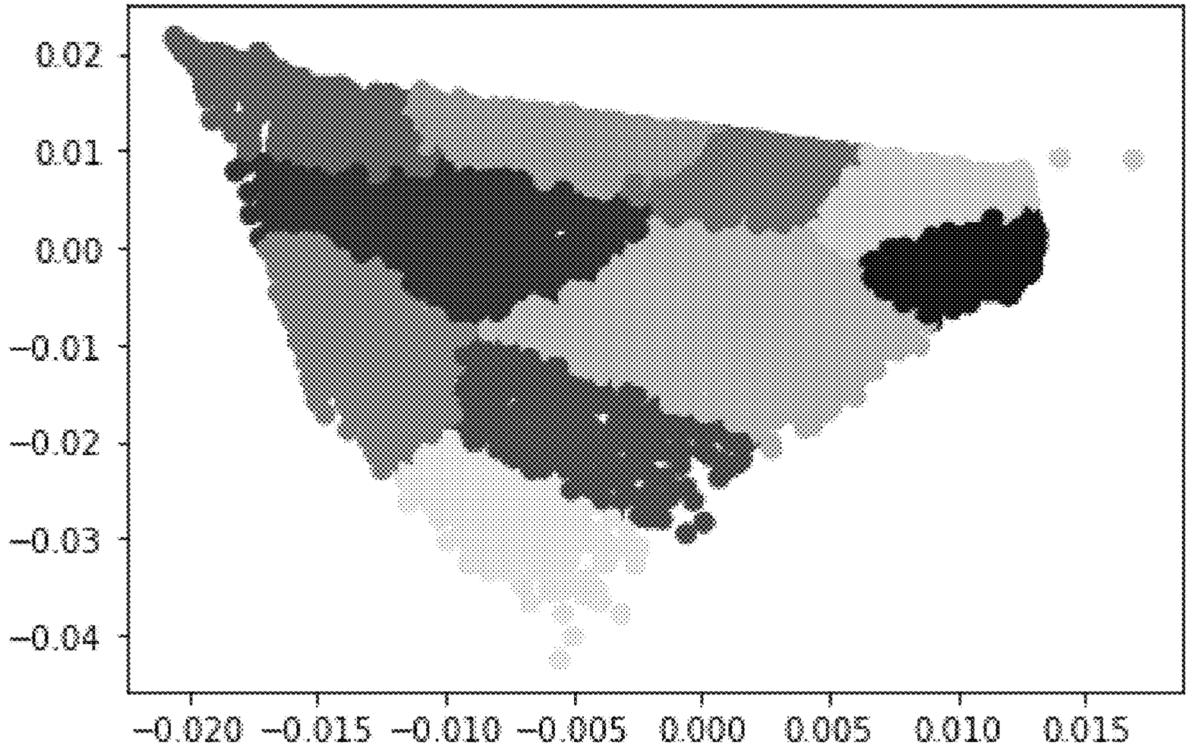
FIG. 6 illustrates a chart showing Locally Linear Embedding ("LLE") transferring a database of computer images, CIFAR-10, into a two-dimensional (2D) space.
Figure 7:
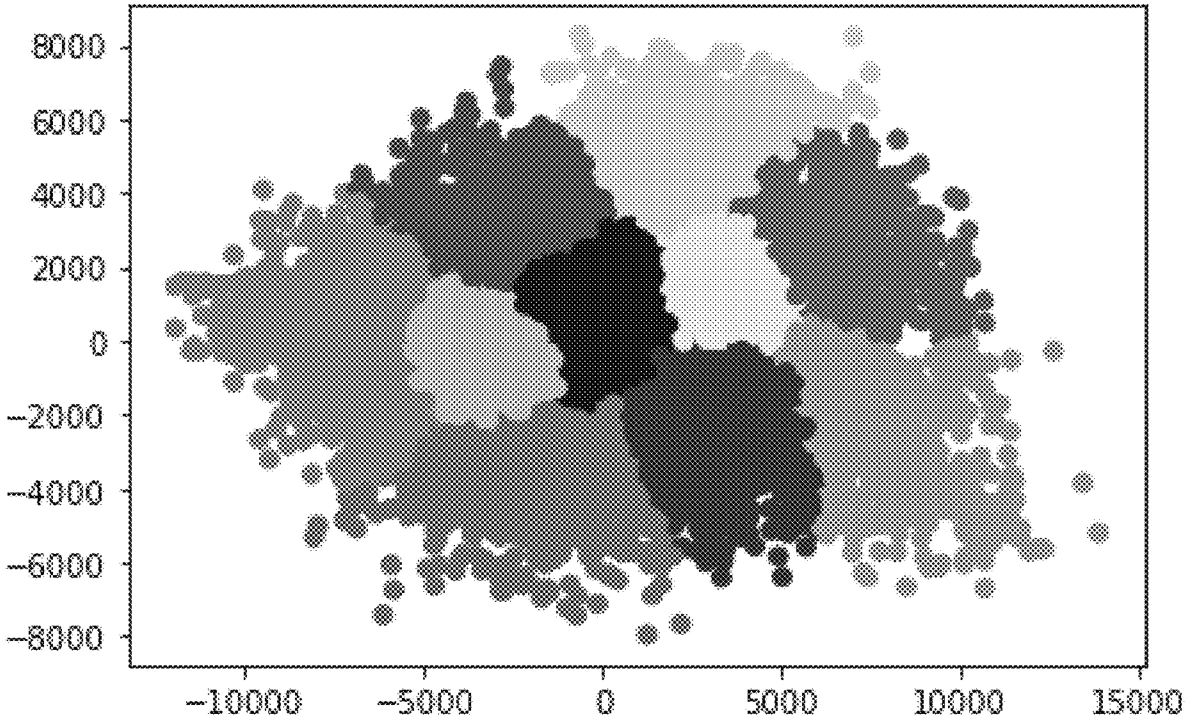
FIG. 7 illustrates a chart showing Isometric Mapping ("ISOMAP") transferring a database of computer images, CIFAR-10, into a two-dimensional (2D) space.

The EM algorithm repeats E step and M step until convergence of $\pi_k$, $\mu_k$, $\Sigma_k$. During inference, for each input X, the likelihood of being a member of Gaussian models is calculated by $\text{Score}(X)=\text{argmax}_{j=1, \ldots, k}\mathcal{N}(X|u_j, \Sigma_j)$. The scoring module 122 uses Score(X) as a criterion to estimate the distance of the inputted sample to ID samples, where EM is applied on the embedded input space. FIGS. 6 and 7 illustrate LLE and ISOMAP, respectively, transferring a database of computer images, CIFAR-10, into a two-dimensional (2D) space, and illustrate the EM approach identifying different Gaussian models in the new embedded space.

In most cases, a DCNN model, which is trained with an ID dataset of K classes, generates a set of confidence scores $\{conf_1, \ldots, conf_K\}$ for each input $x_{test}$. Ideally, the true label of $x_{test}$ is j, where $conf_j$ is significantly greater than any $conf_{z\neq j}$. It is expected that for OOD samples, all confidence scores are approximately equal, having uniform distribution, and are close to zero. However, with real-world data, DCNNs may generate a high confidence score for OOD samples.

The scoring module 122 leverages the outputted confidence score of the DCNN model to identify the confidence score of the model for a given input x. An UncertainityScore function, as defined in Equation (4), can be defined that compares confidence score of a given DCNN model with uniform distribution using KL divergence. For OOD samples, UncertainityScore($x_{OOD}$, DCNN)≈0 is expected which means $\{conf_1, \ldots, conf_K\}$ is similar to $$\left\{\frac{1}{K}, \ldots, \frac{1}{K}\right\}.$$

$$UncertaintyScore(x, DCNN) = D_{KL}(DCNN \text{ confidence scores, Uniform Distribution}) = -\sum_{i=1}^{K}\frac{1}{K}\log(conf_i) + \sum_{i=1}^{K} conf_i * \log(conf_i) \quad (4)$$

In most cases, $f_{vulnerable}$ (x, α1, α2, β) can be used as a function that accepts an input sample x and a set of weighting parameters, and returns $f_{vulnerable}$; which reflects if an OOD sample has a confidence score. α1, α2 and β are weighting parameters that are tunable by a user to control the effect of confidence score and distance to ID for identifying OOD samples. $X_{LLE,d}$ and $X_{ISOMAP,d}$ are d-dimensional embedded input spaces generated by the LLE and ISOMAP algorithms while y=UncertainityScore(x, CNN) is the uncertainty score for the given input x calculated by Equation (4). $EM_{LLE}$ and $EM_{ISOMAP}$ are outputs of EM algorithm for LLE and ISOMAP embedded spaces. $EM_{LLE}$ and $EM_{ISOMAP}$ values show the extent of how far x is from the training data distribution. β and α1,α2 are control parameters. Setting a positive value for β and negative values for α1, α2 results in the optimization module 124 exploring areas where the embedded space is far from ID samples but generates a high confidence score. To determine $f_{vulnerable}$ (i.e., fitness evaluation), in an example, the scoring module 122 can use the following approach:

1. Receive input sample x, α1, α2, β, the trained model DCNN and embedded space dimension d
2. Set $X_{LLE,d}$=embed x using LLE
3. Set $X_{ISOMAP,d}$=embed x using ISOMAP
4. Set y=UncertainityScore (x, DCNN)
5. Set $EM_{LLE}$=EM algorithm score for $X_{LLE,d}$
6. Set $EM_{ISOMAP}$=EM algorithm score for $X_{ISOMAP,d}$
7. Determine $f_{vulnerable}$=α1*$EM_{LLE}$+α2*$EM_{ISOMAP}$+β*y.

In some cases, the optimization module 124 can use Particle Swarm Optimization (PSO), which is an evolutionary search algorithm that optimizes a cost-based problem iteratively to find the best candidate solutions having higher/lower costs. PSO has a population of candidate solutions (P), named particles in the evolutionary computation context, and moves these particles' positions and velocity within the search space to find optimum Ps.

Figure 8:
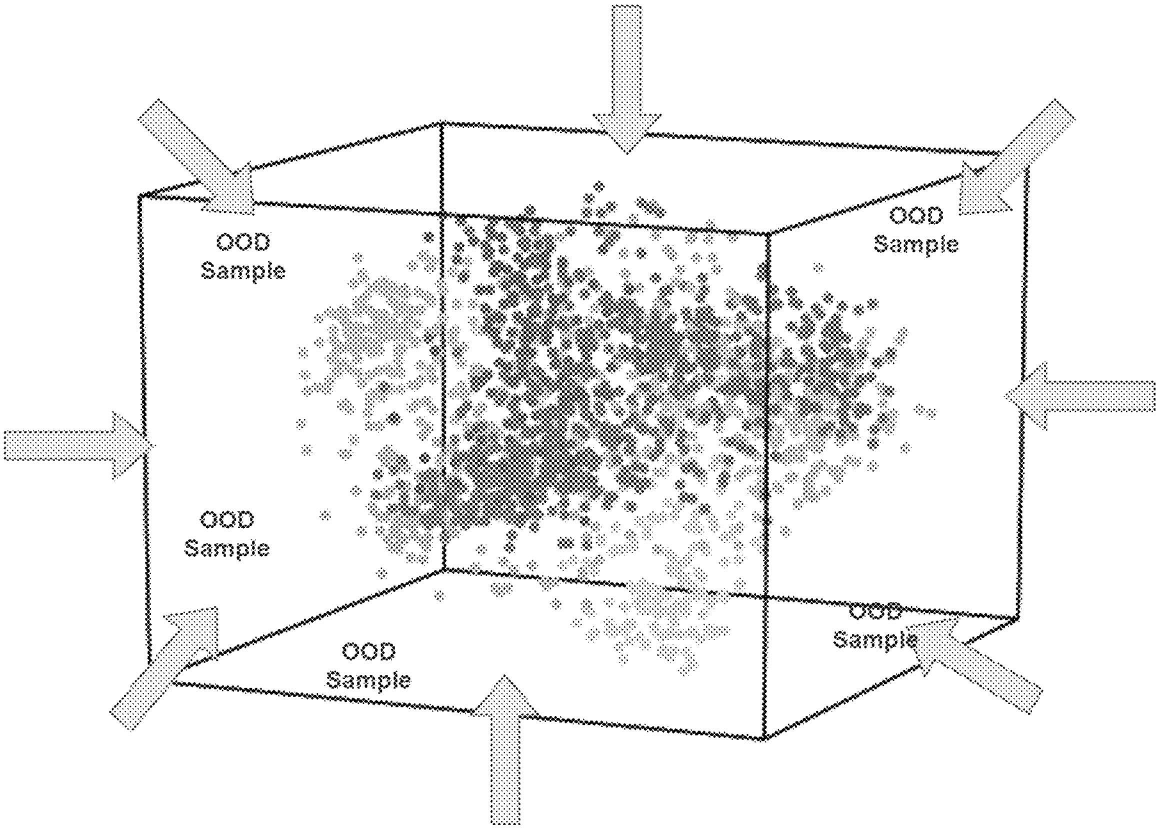
FIG. 8 illustrates a conceptual view of an example of finding attack surfaces.

In PSO, the optimization module 124 uses a linear formulation to update the positions and velocity of particles in each iteration in order to optimize the fitness function and to move particles to locations that maximize (or minimize) the fitness function. PSO can be used by the optimization module 124 to identify the areas of the given DCNN input space most vulnerable to OOD samples. In some cases, to initialize the population of particles (parameter P) and reduce the probability of particles' convergence into a single vulnerable area, the original input space of the given DCNN model can be considere as $CNN_{dimension}$=$image_{height}$*$image_{width}$*3. The population can be initialized as $P_1=\{p_{i,j}|i, j=1, \ldots, CNN_{dimension}$ and $p_{i,j=i}$=255 and $p_{i,j\pm i}$=0}, where $p_i$ is $P_1$'s i'th particle. In this case, 255 is used because the range is between 0 and 255 for possible values for an image's pixel. This approach creates a set of particles in the edge of DCNN's input space that can be moved using PSO into more vulnerable areas where the DCNN model generates a high confidence score when the sample is determined to be further from training data on fitness values. Additionally, $P_2=\{p_{m,n}|m$, n=based 1, . . . , $CNN_{dimension}$ and $p_{m,n}$=255*RandomValue ∈ (0,1), where $p_m$ is the $P_2$'s m'th particle. The optimization module 124 can merge $P_1$ and $P_2$ as $P=P_1 \cup P_2$ and set P to be the initial population. FIG. 8 illustrates a schematic view of an example of the optimization module 124 finding attack surfaces. In essense, how PSO explores a DCNN model's input space and how particles move from the edge of the input space to the most vulnerable OOD areas. Arrows signify how the optimization module 124 explores the input space.

In an example, the PSO optimization by the optimization module 124 can include:

```
Receive model training ID data, trained model C, and d dimension of embedded space
P = Initilize Particles
EBD = Initilize Particles
For itr = 1 to maximum iterations:
  For each item pr in P do:
      fitness_pr = f_vulnerable (pr,α1,α2,β,CNN,d)
      if fitness_pr is higher thanf(prBest):
        prBest = pr
    end
end
gBest = best particles in P
For each item pr in P do:
    v = v + cl * rand(prBest − P) + c2 * rand * (gBest − pr)
    pr = pr + v
end
Output gBest
```

The output module 126 outputs a set of {VulnerableSample$_i$} with a high confidence score of $f_{vulnerable}$, as determined above. In this way, {VulnerableSample$_i$} are particles that could achieve the highest $f_{vulnerable}$ value, which represents the DCNN attack surface. In some cases, the output can be denoted as $\{<x_{i,1}, x_{i,2}, \ldots, x_{i,n}>, <f_{i,1}\ f_{i,2}, \ldots, f_{i,k}>, f_{i,vulnerable}\}$; where $<X_{i,1}, x_{i,2}, \ldots, x_{i,n}>$ is a sample in the input space, $<f_{i,1}, f_{i,2}, \ldots, f_{i,k}>$ indicates the model output for $<x_{i,1}, x_{i,2}, \ldots, x_{i,n}>(n=CNN_{dimension})$ input space, and $f_{i,vulnerable}$ refers to the fitness value calculated for these inputs.

The present inventors conducted example experiments to verify at least some of the substantial advantages of the system 100. The system 100 was evaluated on a range of DCNN models trained with the following datasets for different tasks, ranging from image detection to malware analysis:

- CIFAR-10: The CIFAR-10 dataset is a collection of images that are commonly used to train computer vision algorithms. The CIFAR-10 dataset contains 60,000 32×32 color images in 10 different classes.
- CIFAR-100: The CIFAR-100 dataset is similar to CIFAR-10, except it has 100 classes each containing 600 images. There are 500 training images and 100 testing images per class. The 100 classes in the CIFAR-100 are grouped into 20 super-classes. Each image comes with a "fine" label (the class to which it belongs to) and a "coarse" label (the superclass to which it belongs to).
- SVHN: The Street View House Numbers (SVHN) is a real-world dataset of over 600,000-digit labeled images for object recognition tasks. SVHN is obtained from house numbers in Google™ Street View™ images.
- APT Malware: Advanced persistent threat (APT) Malware was used in order to evaluate the system 100 against DCNNs trained for APT malware categorization. It includes 3594 malware samples belonging to 12 different APT groups. Since DCNN models accept images as input, malware binaries were converted into image files.

DCNN architectures were used in the example experiments, namely ResNet and DenseNet, to train DCNN models using the above datasets, in accordance with Table 1, which shows the accuracy of evaluated DCNN architecture on Training Datasets. In the experiments, the number of iterations in the PSO algorithm was set to 200 and the dimension of the new embedding space was set to 10 in both LLE and ISOMAP.

TABLE 1

| | DenseNet | Resnet |
|---|---|---|
| CIFAR10 | 94.9% | 93.71% |
| CIFAR100 | 78.8% | 74.2% |
| SVHN | 98.1% | 97.9% |
| APT Malware | 98.4% | 98.2% |

Figure 9:
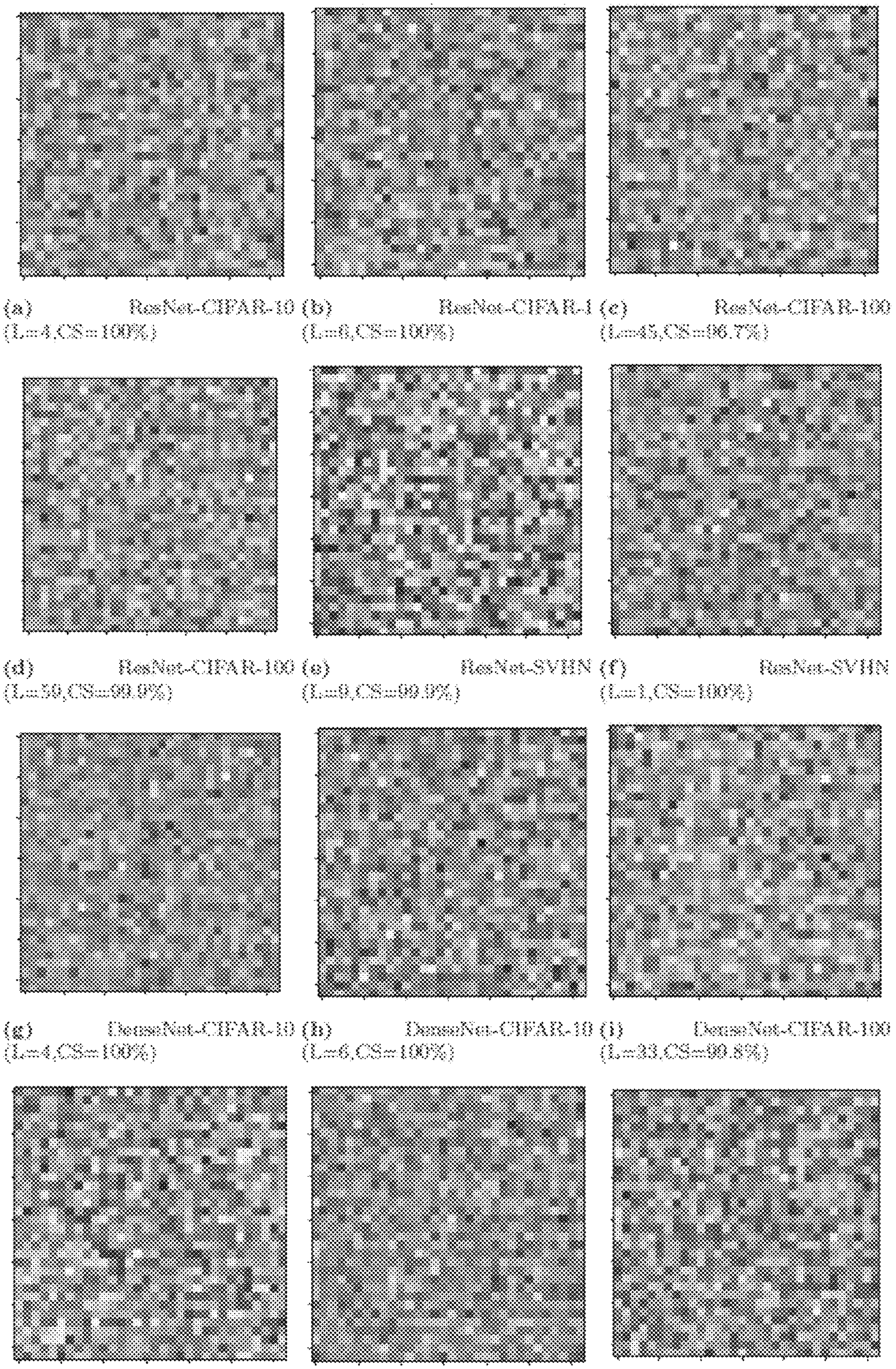
FIG. 9 illustrates a visualization of out-of-distribution ("OOD") samples for example experiments, where L denotes Class Label and CS is for Confidence Score.
Figure 10:
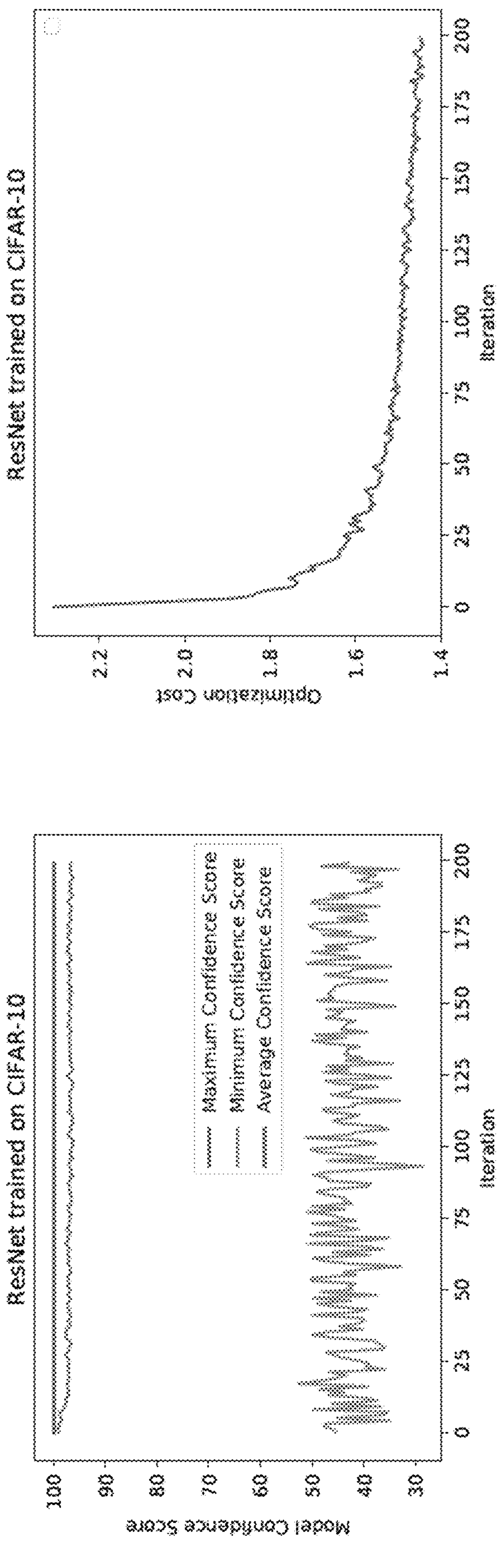
FIG. 10 shows charts of confidence score and optimization cost of the example experiments for ResNet trained on CIFAR-10 dataset.
Figure 11:
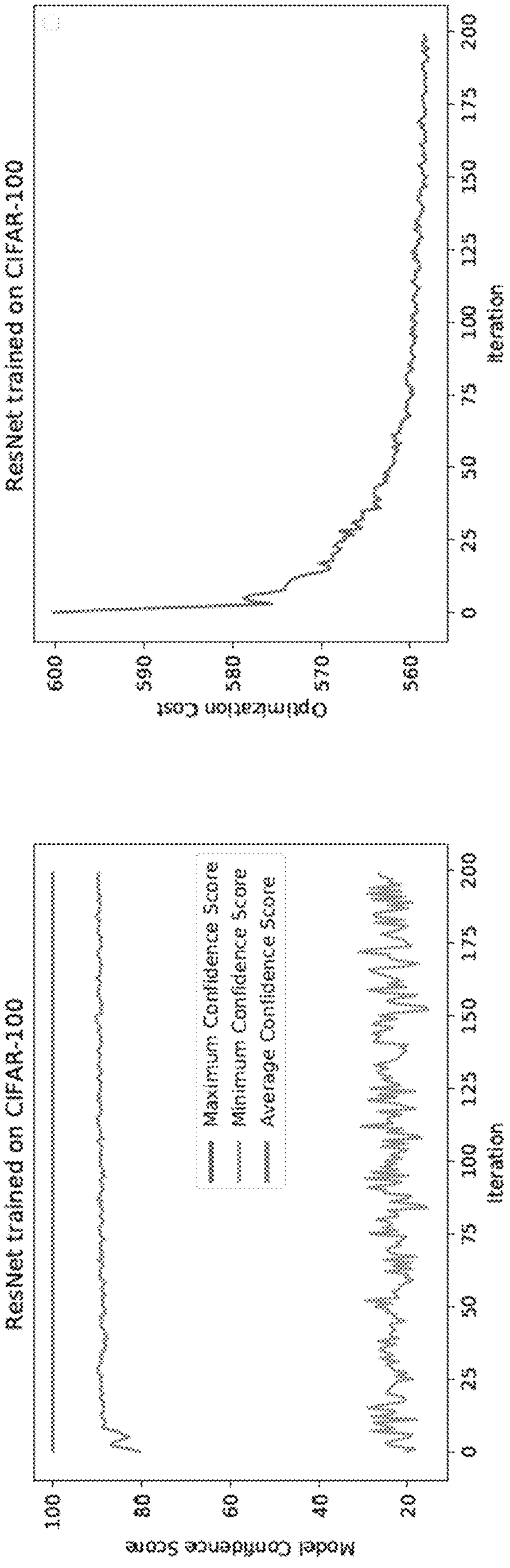
FIG. 11 shows charts of confidence score and optimization cost of the example experiments for ResNet trained on CIFAR-100 dataset.
Figure 12:
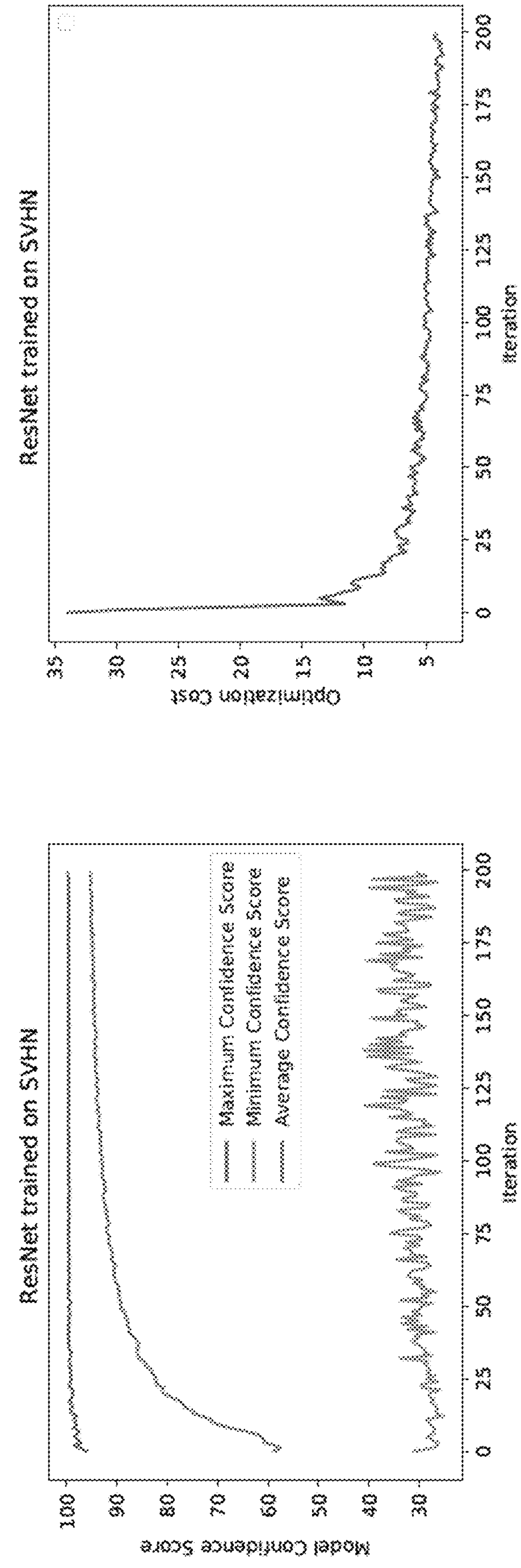
FIG. 12 shows charts of confidence score and optimization cost of the example experiments for ResNet trained on SVHN dataset.
Figure 13:
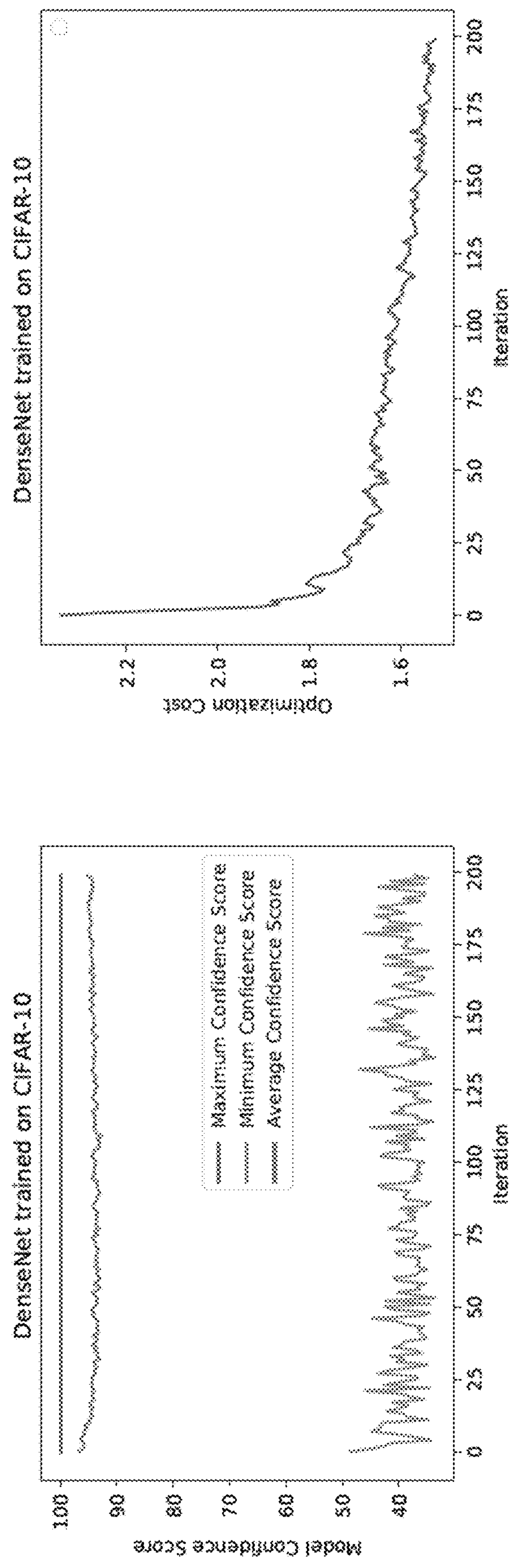
FIG. 13 shows charts of confidence score and optimization cost of the example experiments for DenseNet trained on CIFAR-10 dataset.
Figure 14:
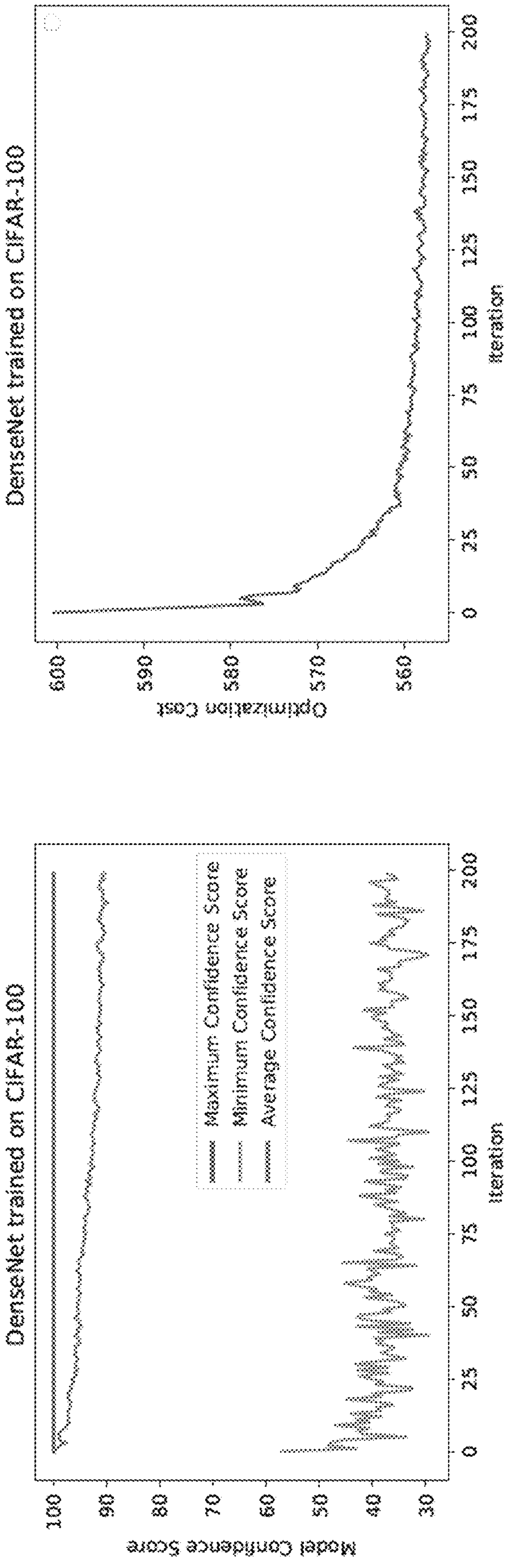
FIG. 14 shows charts of confidence score and optimization cost of the example experiments for DenseNet trained on CIFAR-100 dataset.
Figure 15:
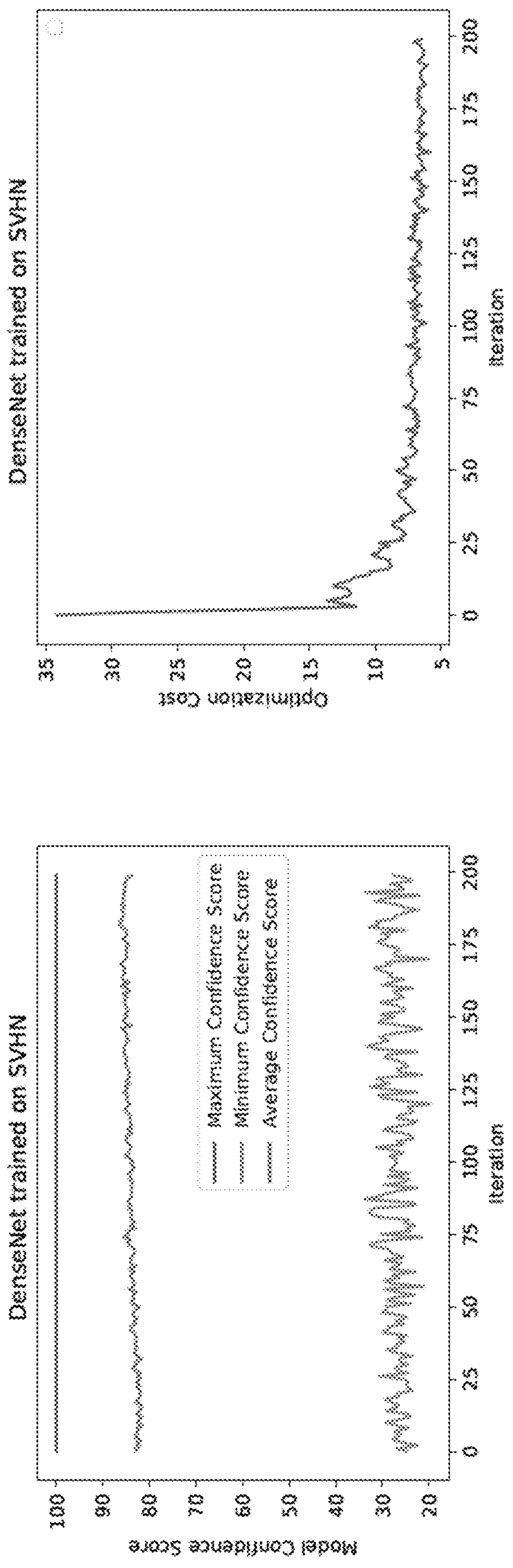
FIG. 15 shows charts of confidence score and optimization cost of the example experiments for DenseNet trained on SVHN dataset.
Figure 16:
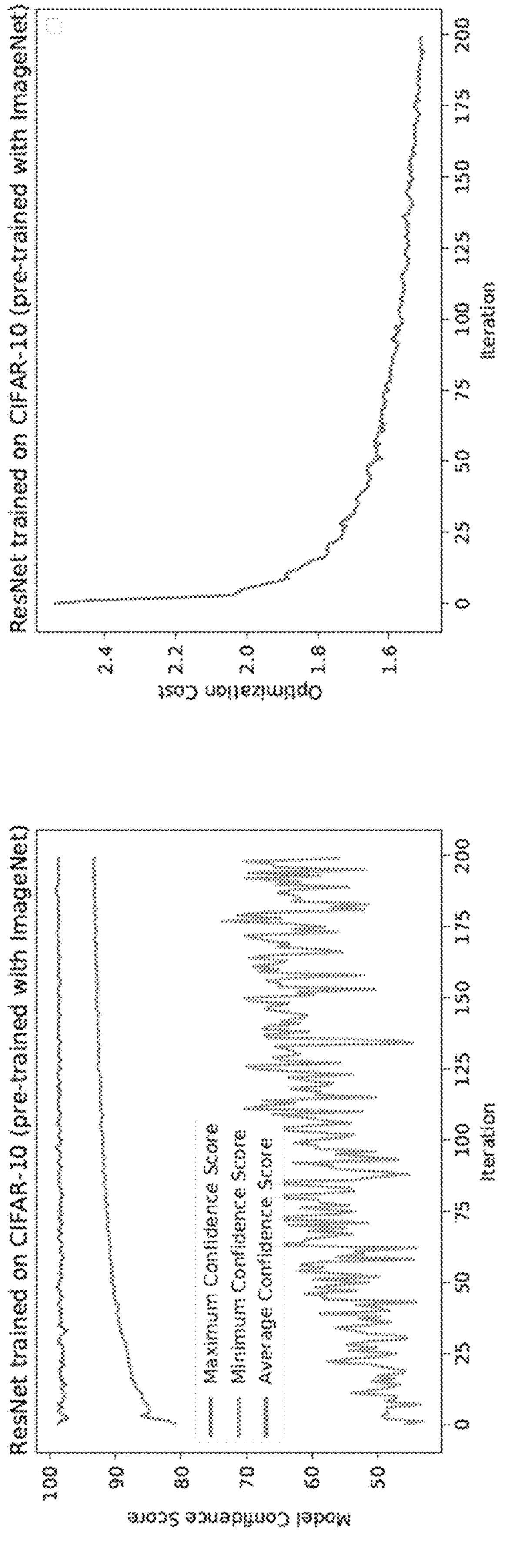
FIG. 16 shows charts of confidence score and optimization cost of the example experiments for ResNet trained on CIFAR-10 dataset (pre-trained with ImageNet dataset)
Figure 17:
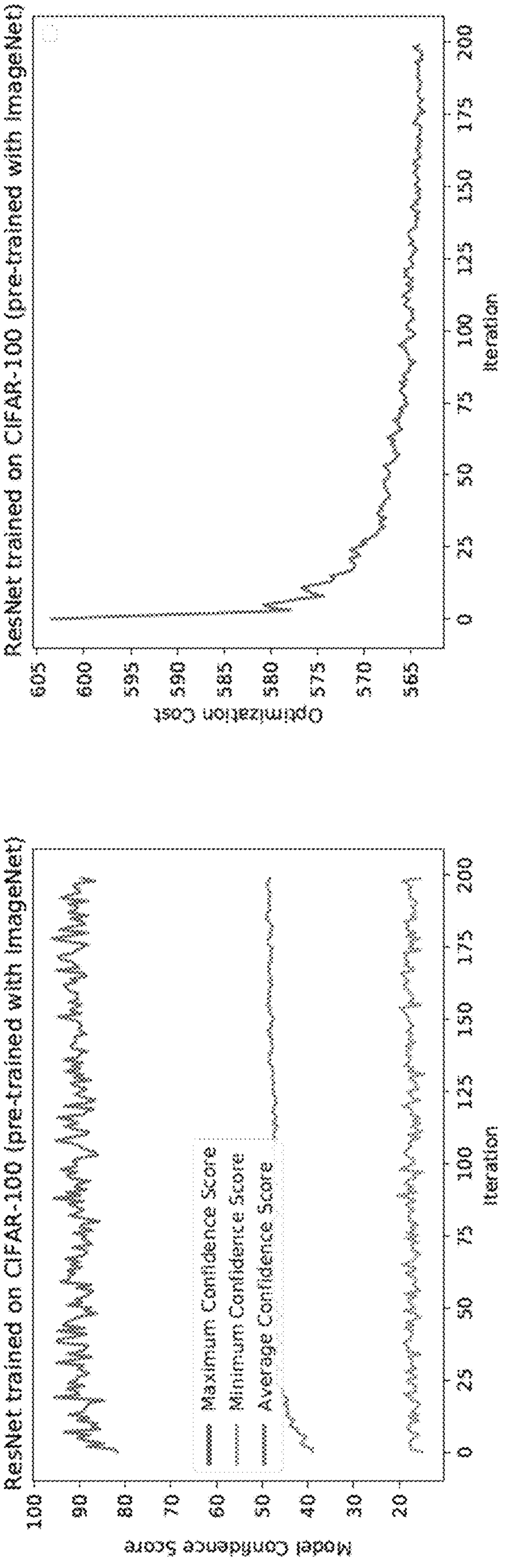
FIG. 17 shows charts of confidence score and optimization cost of the example experiments for ResNet trained on CIFAR-100 dataset (pre-trained with ImageNet dataset)
Figure 18:
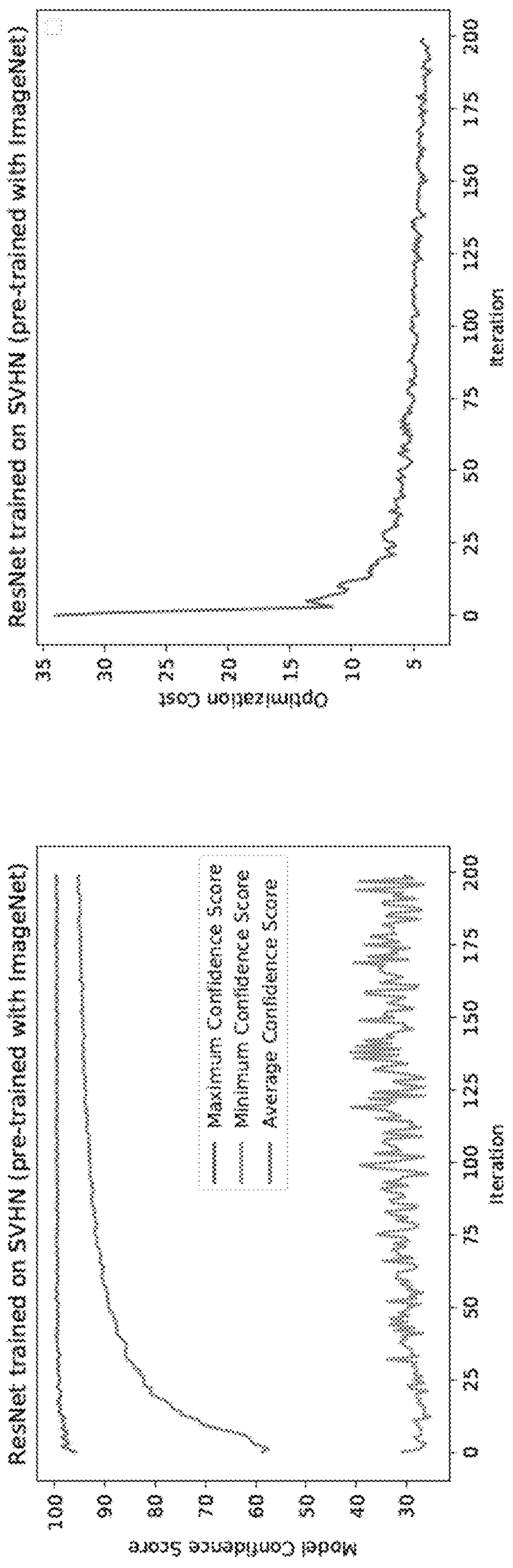
FIG. 18 shows charts of confidence score and optimization cost of the example experiments for ResNet trained on SVHN dataset (pre-trained with ImageNet dataset)
Figure 19:
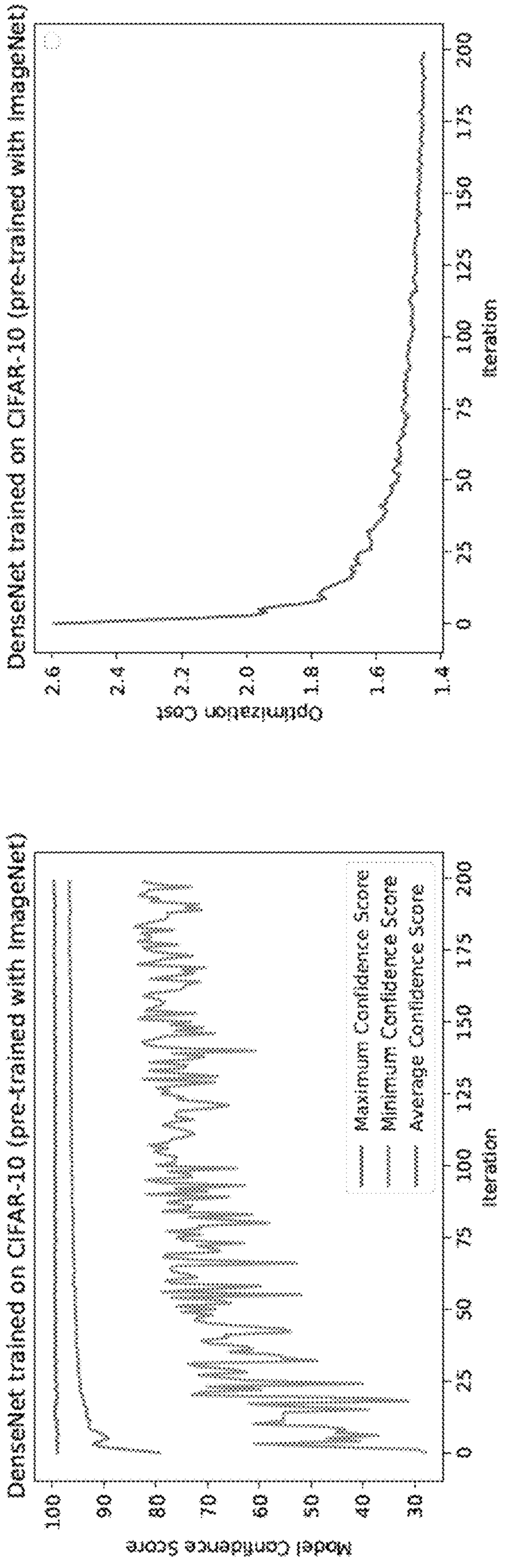
FIG. 19 shows charts of confidence score and optimization cost of the example experiments for DenseNet trained on CIFAR-10 dataset (pre-trained with ImageNet dataset)
Figure 20:
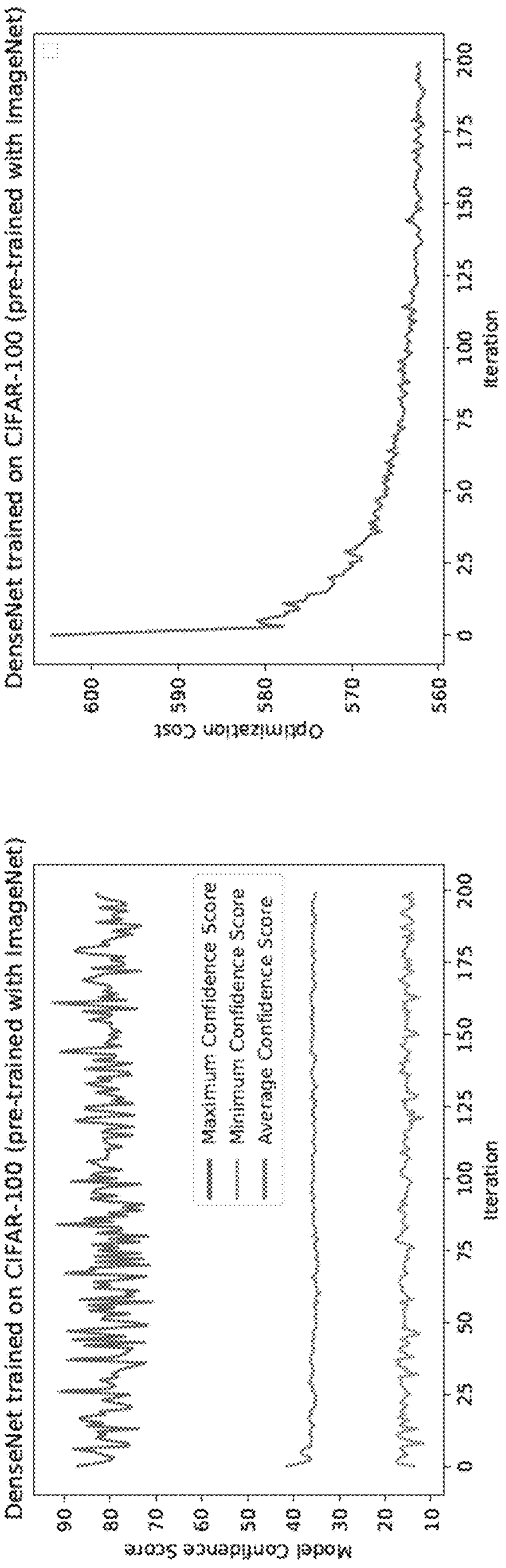
FIG. 20 shows charts of confidence score and optimization cost of the example experiments for DenseNet trained on CIFAR-100 dataset (pre-trained with ImageNet dataset)
Figure 21:
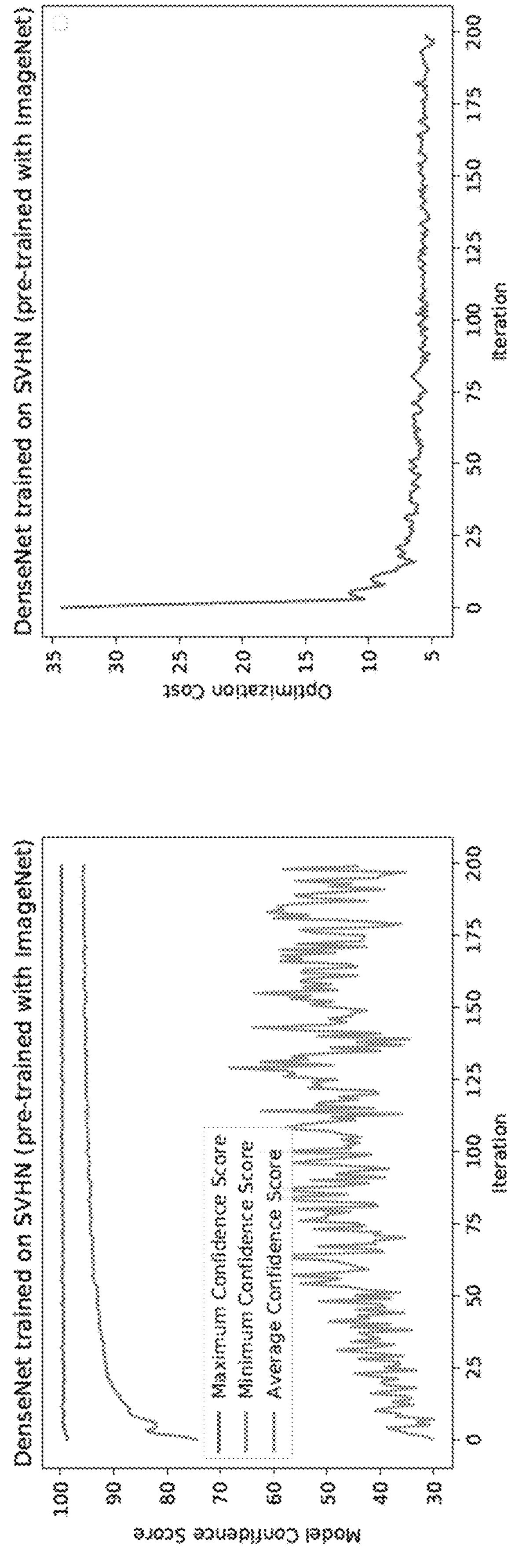
FIG. 21 shows charts of confidence score and optimization cost of the example experiments for DenseNet trained on SVHN dataset (pre-trained with ImageNet dataset).

FIG. 9 shows visualization of OOD samples for the example experiments; where L denotes Class Label and CS is for Confidence Score. As can be seen from FIG. 8, although the system 100 identified OOD samples that are completely incomprehensible (in comparison with the training datasets of the given DCNN models), all DCNN models assigned approximately 100% confidence score to these identified OOD samples FIGS. 10 to 21 show how the optimization of the present system 100 reduces costs to identify highly confident OOD samples. Left-side charts of these figures show maximum, minimum, and average number of explored OOD samples in each iteration, and the right-side charts show optimization cost over iterations. These figures demonstrate that during the optimization iterations, the cost of optimization is decreasing, which indicates that the optimization was able to identify OOD areas in the input space that generate a higher erroneous confidence score. FIG. 10 shows ResNet trained on CIFAR-10 dataset; FIG. 11 shows ResNet trained on CIFAR-100 dataset; FIG. 12 shows ResNet trained on SVHN dataset; FIG. 13 shows DenseNet trained on CIFAR-10 dataset; FIG. 14 shows DenseNet trained on CIFAR-100 dataset; FIG. 15 shows DenseNet trained on SVHN dataset; FIG. 16 shows ResNet trained on CIFAR-10 dataset (pre-trained with ImageNet dataset); FIG. 17 shows ResNet trained on CIFAR-100 dataset (pre-trained with ImageNet dataset); FIG. 18 shows ResNet trained on SVHN dataset (pre-trained with ImageNet dataset); FIG. 19 shows DenseNet trained on CIFAR-10 dataset (pre-trained with ImageNet dataset); FIG. 20 shows DenseNet trained on CIFAR-100 dataset (pre-trained with ImageNet dataset); and FIG. 21 shows DenseNet trained on SVHN dataset (pre-trained with ImageNet dataset).

As can be seen from FIGS. 10 to 21, the system 100 successfully identified at least one super confident OOD sample for each model. In addition, the average confidence score for OOD samples at each iteration was quite high. Furthermore, all confidence scores, maximum, minimum, and average, were significantly higher than $$\frac{1}{num\ \text{of classes}}$$

that would be sufficient for deciding on an arbitrary input. For instance, FIG. 16 illustrates the minimum values of identified OOD samples fluctuate around 40%, and since the CIFAR-10 dataset has ten classes, the labels having more than $$\frac{1}{10}$$

can be considered as confident labels. In addition, it is evident that average and maximum values are between 97% and 100%, which reflect the high confidence outputs.

Generally, pre-training has a positive impact on the robustness of models against OOD inputs. Therefore, in order to evaluate the system's 100 performance against pre-trained models, the DCNNs were trained with the ImageNet dataset. Afterwards, the experimental procedure was applied on pre-trained models.

As it is evident from FIGS. 16 to 21, applying the system 100 on pre-trained DCNN models can obtain comparable results with DCNN models trained from scratch. Moreover, comparing FIGS. 17 and 20 with FIGS. 16, 18, the maximum trends demonstrate more oscillative behaviour. However, values are considerably high for making the decision about a generated label.

Generating adversarial payloads based on the query-limited approach turns these attacks into harmful category adversarial attacks. The Projected Gradient Descent (PGD) attack follows an iterative approach to generate a sequence of queries (adversarial payloads) by modifying initial sample $x^0$ until achieving a high confidence score for the final sample ($x^{final}$) of sequence (see Equation (5)). The PGD method was used as the attack scenario to show the performance of the identified OOD samples in decreasing the length of generated sequence.

$$x^{t+1} = \prod_{x+s} (x^t + \alpha * \text{sgn}(\nabla xJ(w, x, y))) \quad (5)$$

Ten samples were randomly selected to initialize the PGD attack, and was repeated ten times. The number of PGD attack's iterations were recorded (length of generated sequence of queries). In a similar approach, a PGD attack was performed using randomly selected ten ID samples as initial samples and was repeated ten times. The number of attack's interactions were recorded.

Table 2 shows the average number of required queries to obtain a confidence score of more than 90% for generated OOD adversarial inputs by PGD. As can be seen from the table, using any samples identified attack surface for initializing PGD attack, an adversary can bypass the target DCNN model with far fewer queries in comparison with initializing PGD attack from ID samples.

TABLE 2

| | | CIFAR-10 | CIFAR-100 | SVHN |
|---|---|---|---|---|
| ResNet | PGD | 45.1 | 51.2 | 39.8 |
| | $PGD_{vul}$ | 8.8 | 9.1 | 5.2 |
| DenseNet | PGD | 21.1 | 25.4 | 18.3 |
| | $PGD_{vul}$ | 7.1 | 7.4 | 6.8 |

TABLE 3

| | | CIFAR-10 | CIFAR-100 | SVHN |
|---|---|---|---|---|
| ResNet | I-FGSM | 37.3 | 40.6 | 29.1 |
| | I - $FGSM_{vul}$ | 5.1 | 5.7 | 4.8 |
| DenseNet | I-FGSM | 19.9 | 22.6 | 17.3 |
| | I - $FGSM_{vul}$ | 6.2 | 6.2 | 5.9 |

Deep learning model's vulnerabilities can generally be transferrable between different models. Transferability of an OOD sample denotes the possibility that a malicious OOD input that is effective against a trained model $model_1$ being effective against another model $model_2$ and generates erroneous confident outputs. In order to evaluate to what extent OOD samples identified by the system 100 are transferable to other DCNN models, the example experiments inputted identified OOD samples from experiment {model=$m_1$, $m_1$ ∈ M&dataset=$ds_1$ $ds_1$ ∈ DS} to different trained DCNN models denoted as M={ResNet, DenseNet} and DS={CIFAR–10, CIFAR–100, SVHN}; and calculated the average confidence scores of OOD samples on the new models.

Table 4 shows an average of models' confidence score for transferred OOD samples. Table 4 gives information about transferred samples' success rate. Non-diagonal values represented the average confidence score for samples generated on source DCNN models and tested on the target model. As can be seen from the table's results, the average confidence scores vary between 78.6% and 97.4% and, for a majority of experiments, are higher than 85%.

TABLE 4

| | | | Target | | | | | |
|---|---|---|---|---|---|---|---|---|
| | | | ResNet | | | DenseNet | | |
| | | | CIFAR-10 | CIFAR-100 | SVHN | CIFAR-10 | CIFAR-100 | SVHN |
| Source | ResNet | CIFAR-10 | — | 86.5% | 86.2% | 89.6% | 87.2% | 84.4% |
| | | CIFAR-100 | 92.3% | — | 86.5% | 87.2% | 84.7% | 81.7% |
| | | SVHN | 94.5% | 83.7% | — | 92.1% | 88.2% | 83.8% |
| | DenseNet | CIFAR-10 | 95.0% | 82.3% | 86.2% | — | 90.4% | 81.4% |
| | | CIFAR-100 | 97.4% | 78.6% | 87.2% | 91.7% | — | 81.8% |
| | | SVHN | 93.5% | 89.8% | 86.5% | 89.0% | 87.6% | — |

Iterative Fast Gradient Sign Method (I-FGSM) is another iterative adversarial attack that repeatedly generates adversarial examples based on FGSM (see Equation (6)).

$$x_{adv}^{t+1} = \text{Clip}_{x,\epsilon}\{x_{adv}^t - \alpha * \text{sgn}(\nabla xJ(x_{adv}^t, y_L))\} \quad (6)$$

Where ϵ is perturbation parameter, J refers to loss function and $y_L$ denotes least likely class and α controls the step size. The same experiment settings were used as in the PGD attack and the average length of queries was measured as generated to bypass the given DCNN model. Table 3 illustrates an average length of queries generated by I-FGSM attack to bypass DCNN model. As shown in Table 3, using the system's 100 identified OOD samples as I-FGSM's initial samples results in less iterations for generating adversarial samples and bypassing DCNN models.

In addition to the CIFAR datasets, and to illustrate the importance of identifying the OOD attack surface, the example experiments evaluated the performance of the system 100 on DCNN based malware detection models. To do so, a ResNet and a DenseNet were trained with extracted malware images of an APT malware opcode dataset.

Firstly, the example experiments applied the system 100 on trained DCNNs. The system 100 generated OOD images which were equivalent to sequence of OpCodes. For instance, the system 100 generated an OOD image having value V at pixel point (x,y), which corresponds to OpCode P, related to point (x,y) during binary to image transformation, with V occurrences. As can be seen in Table 5, the generated OOD samples were capable of bypassing DCNN models and achieving high confidence score of 93.2% and 94.1% for ResNet and DenseNet respectively. Secondly, identified OOD samples were fed to the other trained DCNN models to evaluate transferability of those samples. For instance, OOD samples generated for ResNet model were submitted to DenseNet model. Transferred samples could achieve high erroneous confidence score of 89.9% and 91.2%. These results demonstrate the vulnerability of current approaches to DCNN-based malware detectors, which are widely utilized in the cybersecurity domain, to the OOD inputs. In addition, the results show the usefulness of the present system 100 for generating OOD samples on such DCNNs that can be leveraged for assessment or to improve robustness of DCNN-based malware detection systems.

TABLE 5

| | OOD samples | Transferred OOD samples |
|---|---|---|
| ResNet | 93.2% | 89.9% |
| DenseNet | 94.1% | 91.2% |

Overall, despite the potential of DCNN models in various classification tasks, they are generally unreliable in dealing with OOD inputs. The system 100 can be advantageously used to identify attack surfaces of DCNN models against OOD examples and to detect parts of the input space that make a DCNN model generate confident OOD outputs. The system 100 can accept a trained DCNN model and its training dataset and makes determinations on the input space of the model to identify OOD samples that generate high confidence labels. An adversary might use such attack surfaces to target the given DCNN model with a very high success rate. The system 100 is thus able to be used for malware detection to identify high-risk attack surfaces.

Figure 22:
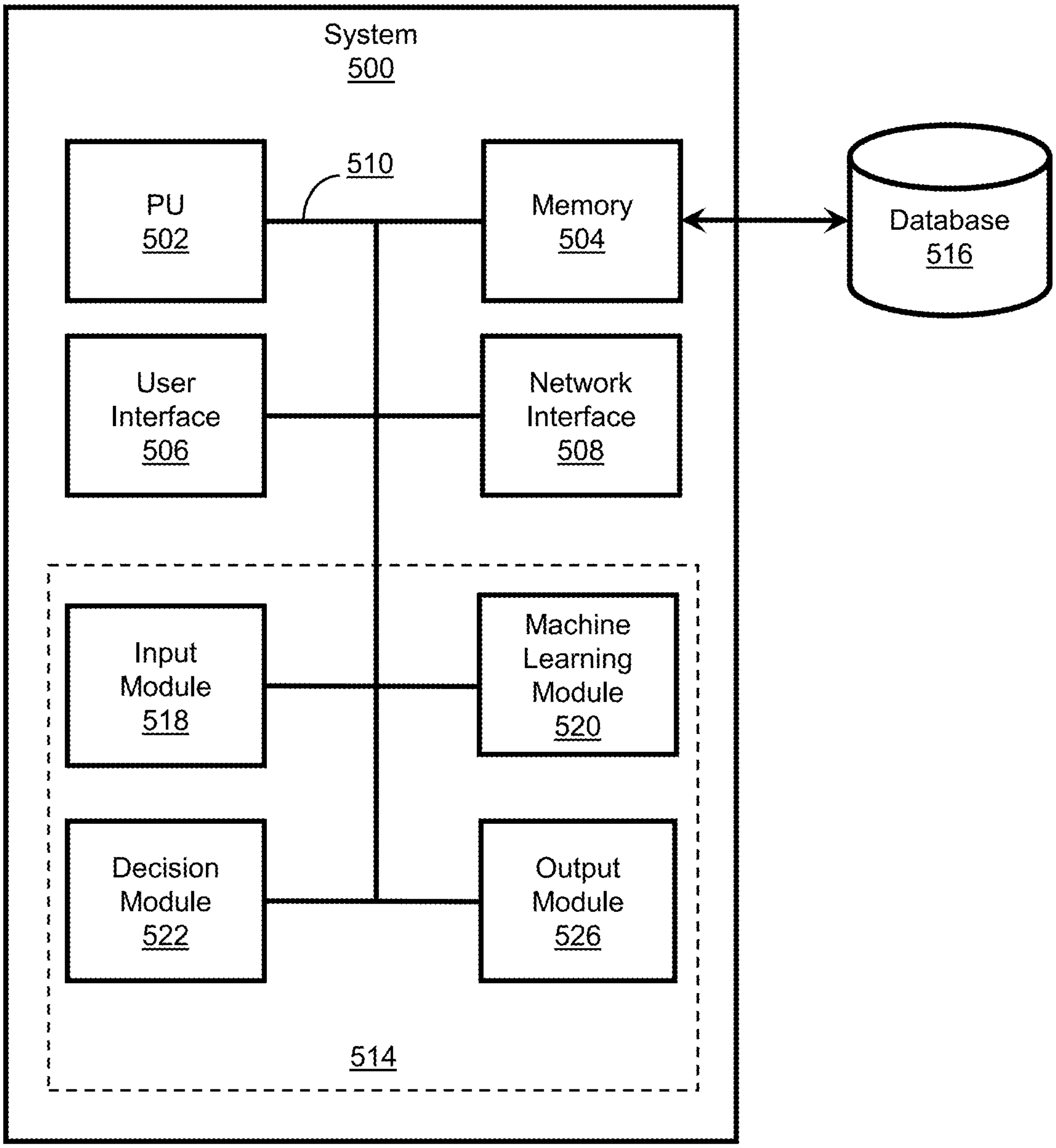
FIG. 22 is a schematic diagram of a system for determination of out-of-distribution samples for artificial neural networks, according to another embodiment.

Referring now to FIG. 22, a system 500 for determination of out-of-distribution samples for artificial neural networks, in accordance with another embodiment, is shown. In this embodiment, the system 500 is run on a local computing device (such as local computing device 26 in FIG. 2). In further embodiments, the local computing device 26 can have access to content (e.g., the DCNN model) located on a server (32 in FIG. 2) over a network, such as the internet (network 24 in FIG. 2). In further embodiments, the system 500 can be run on any suitable computing device; for example, on the server (32 in FIG. 2).

In some embodiments, the components of the system 500 are stored by and executed on a single computer system. In other embodiments, the components of the system 500 are distributed among two or more computer systems that may be locally or remotely distributed.

FIG. 22 shows various physical and logical components of an embodiment of the system 500. As shown, the system 500 has a number of physical and logical components, including a processing unit ("PU") 502 (comprising one or more processors), memory 504, a user interface 506, a network interface 508, non-volatile storage 512, and a local bus 510 enabling PU 502 to communicate with the other components. The PU 502 can comprise, for example, a central processing unit (CPU) and/or a graphical processing unit (GPU). PU 502 executes various modules, as described below in greater detail. The memory 504 provides relatively responsive storage to the PU 502. The user interface 506 enables an administrator or user to provide input via an input device, for example a keyboard and mouse. The user interface 506 can also output information to output devices to the user, such as a display and/or speakers. The network interface 508 permits communication with other systems, such as other computing devices and servers remotely located from the system 500, such as for a typical cloud-based access model. The memory 504 stores computer-executable instructions for implementing the modules, as well as any data used by them. Additional stored data can be stored in a database 516, such as the data in the databases described herein (adversarial samples database, adversarial signatures database). During operation of the system 500, the modules and the related data may be retrieved from the memory 504 to facilitate execution.

In an embodiment, the system 500 further includes a number of functional/conceptual modules 514 that can be executed on the PU 502; for example, an input module 518, a machine learning module 520, a decision module 522, and an output module 526. In some cases, the functions and/or operations of the modules can be combined or executed on other modules.

In an example, the system 500 can be advantageously employed by developers of neural networks such that, as the developers compile the code and train the network, they can integrate the output of the system 500 to address vulnerabilities of the network to OOD adversarial samples. The system 500 provides an approach using a model that learns activity patterns of DCNN's layers for ID inputs and, through two levels of classifiers, accurately identifies OOD (and in some cases, adversarial inputs) by their abnormal activity patterns. The present inventors determined that there is a distinguishable activity pattern within a DCNN's layers whereby a model can be used to efficiently detect OOD and adversarial examples based on the learned activity patterns for ID inputs.

The model employed by the machine learning module 520 can learn the activity pattern of a DCNN's layers for ID inputs to detect OOD inputs, without the need to initially observe these out-of-norm payloads. Additionally, this model can accurately detect adversarial examples based on the learned activity patterns and can operate sufficiently close to real-time during inference time. Advantageously, the model employed by the machine learning module 520 can be applicable to almost any pre-trained DCNN model.

Typically, a DCNN model's architecture includes a sequence of layers, $(\{L_1, L_2, L_3, \ldots, L_N\})$, where each layer $L_i$ includes a set of M parameters, $\theta_{L_i}=\{\theta_{1,L_i}, \theta_{2,L_i}, \ldots, \theta_{M,L_i}\}$. During a training phase, and throughout a back-propagation optimization phase, these parameters are tuned. A DCNN model can be formulated as a function $\hat{y}=F(x_{input}, \theta)$, where $\hat{y}$ is the predicted class for an input image $x_{input}$. $\theta$ is the series of all layers' parameters, tuned by gradient descent optimization, as Equation (6) (where $\alpha$ is learning rate and x is training dataset).

$$\theta = \theta - \alpha \frac{\partial}{\partial \theta} J(y, F(x, \theta)) \tag{6}$$

For a trained layered DCNN model, each layer acts as function $$f_{L_i}\left(\text{output}_{f_{L_{i-1}}}, \theta_{L_i}\right).$$

It means $f_{L_i}$ accepts an output of layer $L_{i-1}$ and uses optimized parameter set $\theta_{L_i}$ to generate $f_{L_i}$ as input for $f_{L_{i+1}}$. For $f_{L_1}$, the input is $x_{input}$. In addition, the output of $f_{L_N}$ is the DCNN classification outcome. The output of fun is a set of confidence scores for each class within training data ($ID_{train}$ dataset) and the class having highest confidence score is considered as the label for $x_{input}$. Hence, a DCNN processes input $x_{input}$ and generates a final label $\hat{y}$. The $x_{input}$ is processed through the different DCNN layers (see Equation (7)). Therefore, each layer i generates an output $f_{L_i}$ for $x_{input}$.

$$F_{DCNN}(x_{input}) = \hat{y} = f_{L_N} \tag{7}$$

The present inventors have determined that despite $F(x_{OOD})$ generating a high confidence score for OOD inputs with $F(x, \theta)=F(x+\delta,\theta)$ for adversarial examples, these examples may not generate a comparable output with benign examples drawn from ID distribution(s) in all layers. Therefore, the model employed by the machine learning module 520 learns patterns for the DCNN layers for ID examples and then recognizes OOD and adversarial examples based on the pattern in different layers. To perform this learning operation, the model can include two-stages of classifiers that learn output patterns of layers for ID examples in order to distinguish from OOD and adversarial examples. In an example, Equation (8) formulates the model employed by the machine learning module 520:

$$\Psi(x_{input}) = \Omega(\Lambda(x_{input})) \tag{8}$$

Figure 23:
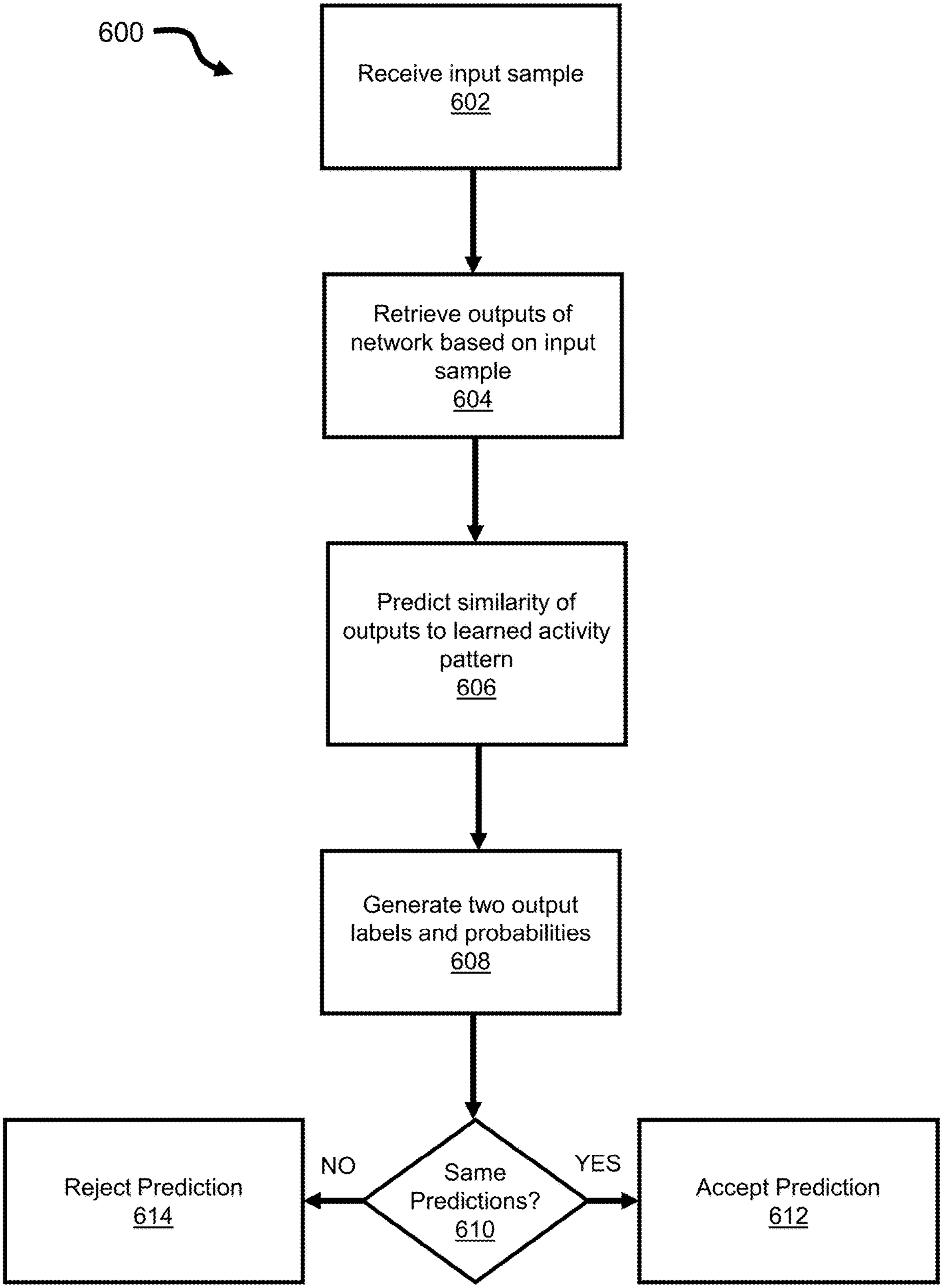
FIG. 23 is a flowchart of a method for determination of out-of-distribution samples for artificial neural networks, according to another embodiment.

FIG. 23 illustrates a flowchart diagram of a method 600 for determination of out-of-distribution samples for artificial neural networks, according to an embodiment; and for illustrative purposes, in accordance with the notation of Equation (8). At block 602, the input module 518 receives an input sample, $x_{input}$. At block 604, in a first stage, represented as A, the machine learning module 520 takes the input sample, $x_{input}$, and retrieves outputs of the layers of the DCNN, $f_{L_i}$, for the $x_{input}$. At block 606, the machine learning module 520 passes the outputs, $f_{L_i}$s, to one or more classifiers that predict similarity of the DCNN outputs, $f_{L_i}$s, to a learned activity pattern based on a training dataset. The output of the first stage, Λ, is a set of labels and probabilities for the one or more classifiers' predictions. The machine learning module 520 uses the output of the first stage as input to a second stage, Ω. At block 608, as part of this second stage, Ω, the machine learning module 520 generates two output labels based on set of labels and probabilities from the first stage, Λ. At block 610, the decision module 522 compares a prediction of the DCNN to the input sample to the two output labels. If the predictions are the same, then at block 612, the decision module 522 accepts the DCNN's prediction, and otherwise, at block 614, the decision module 522 rejects the DCNN's prediction.

Figure 24:
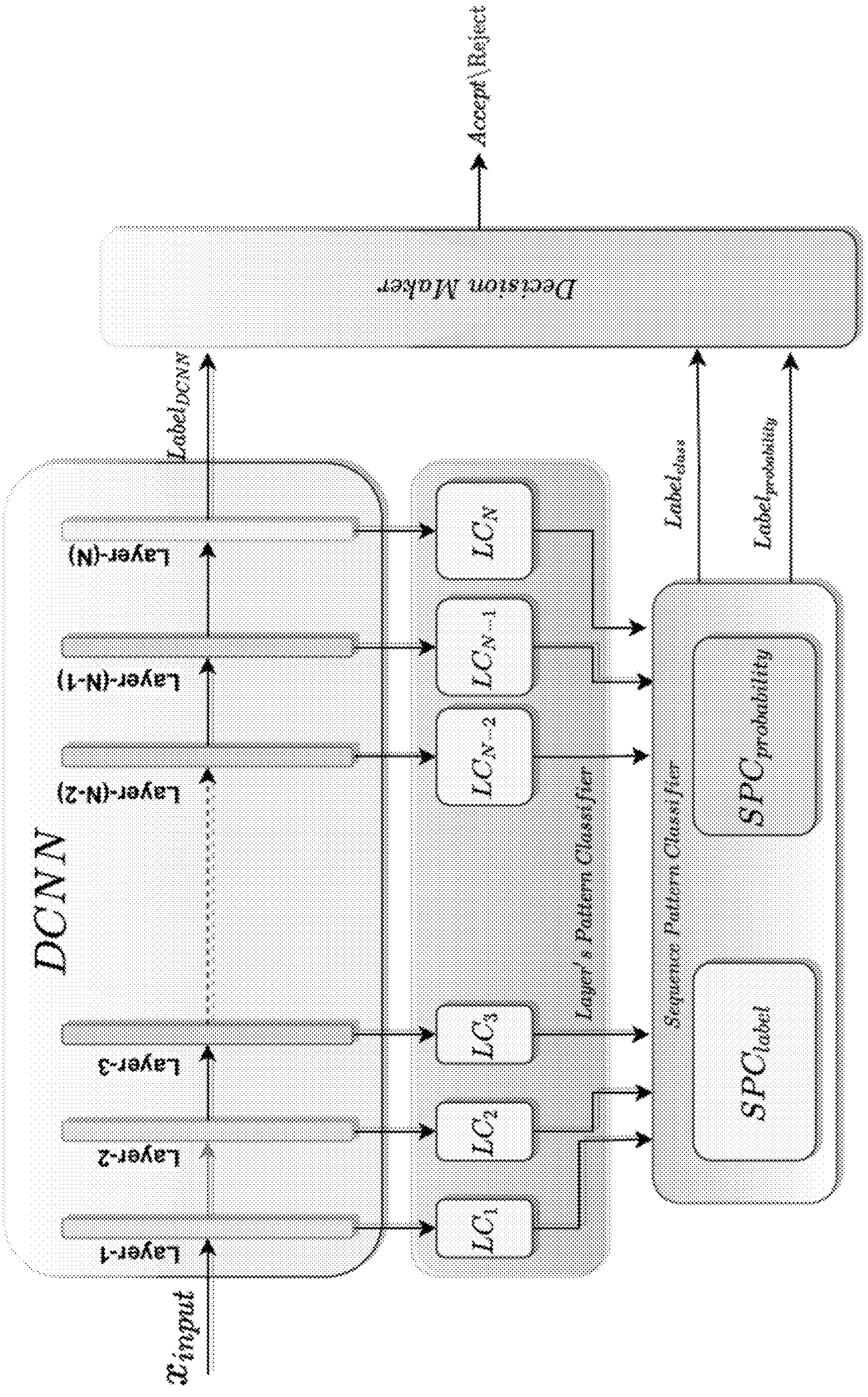
FIG. 24 schematically illustrates an example architecture of the model employed by the system of FIG. 22.

FIG. 24 schematically illustrates an example architecture of the model.

Figure 25:
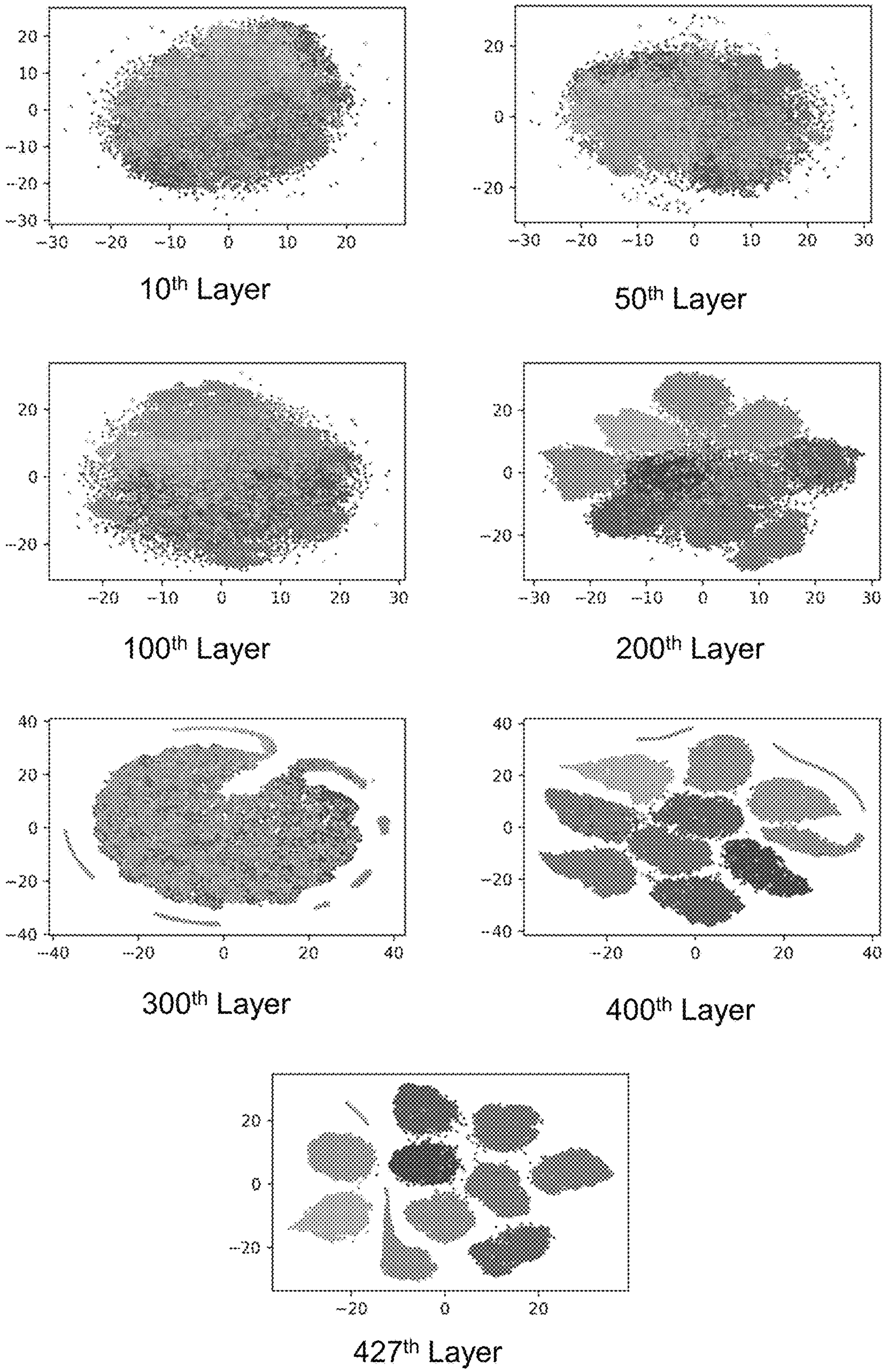
FIG. 25 illustrates an example for outputs of DenseNet's layers for a CIFAR-10 training dataset (in-distribution dataset)
Figure 26:
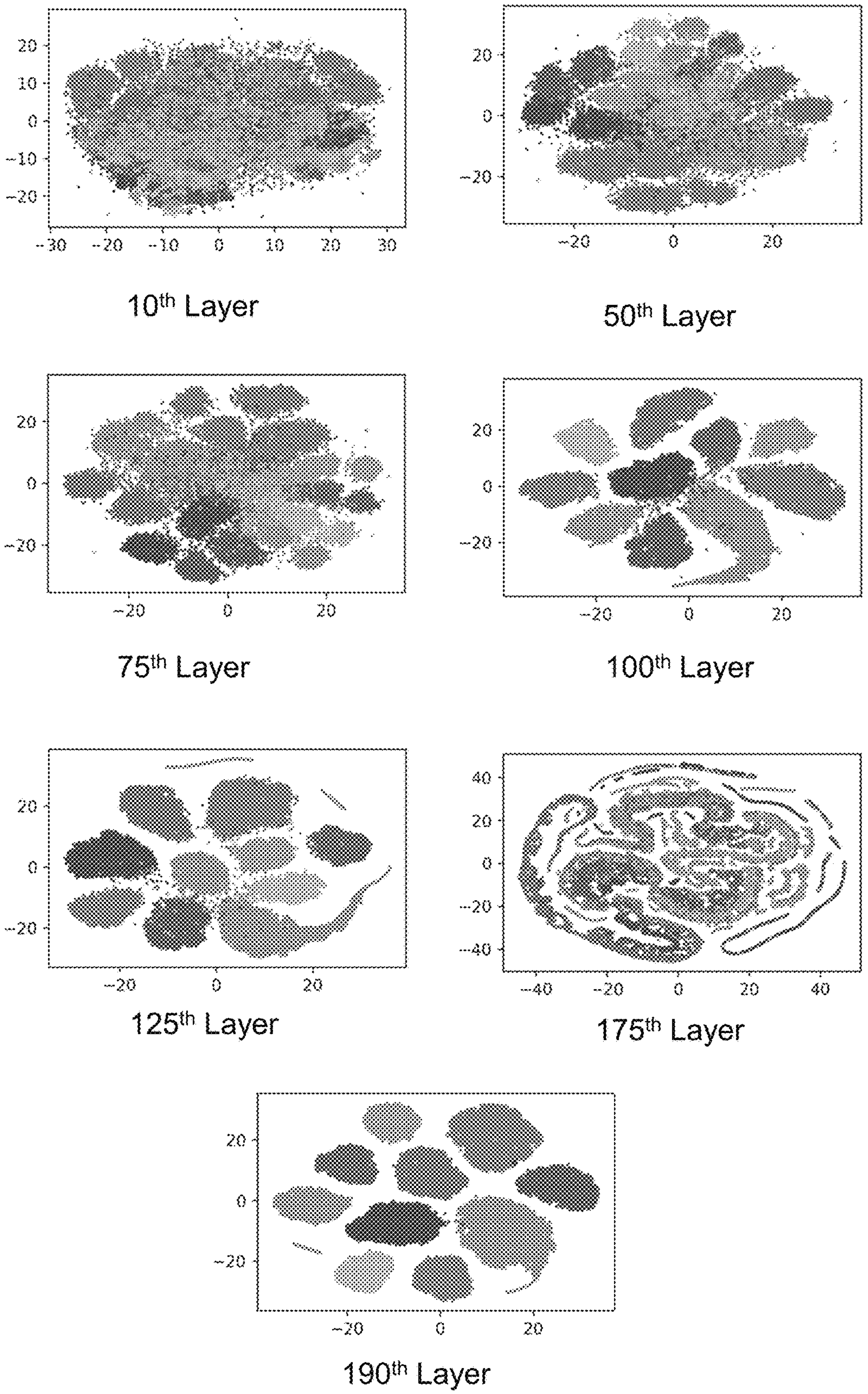
FIG. 26 illustrates an example for outputs of ResNet's layers for a SVHN training dataset (in-distribution dataset)
Figure 27:
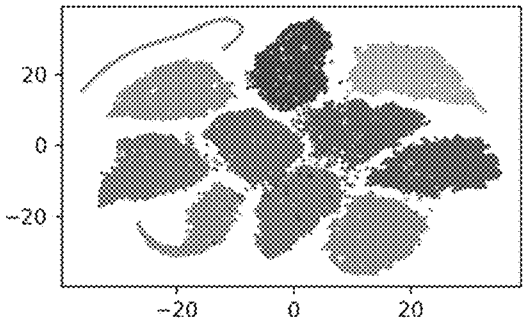
FIG. 27 illustrates an example of an output of the layers of a deep convolutional neural network for in-distribution samples.
Figure 27:
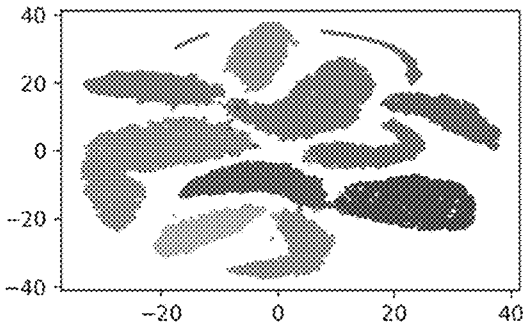
Figure 27:
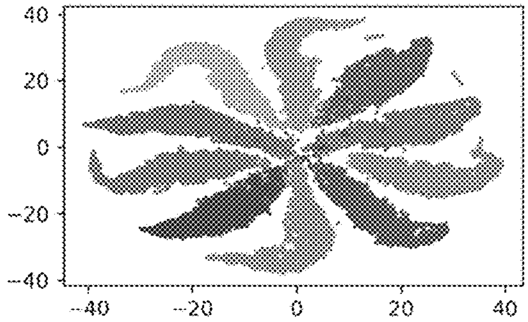
Figure 27:
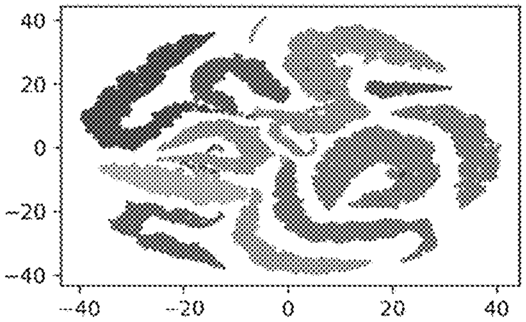
Figure 28:
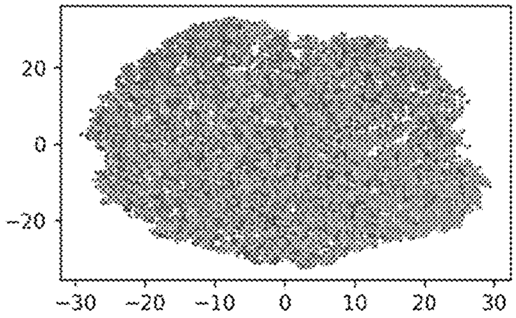
FIG. 28 illustrates an example of an output of the layers of a deep convolutional neural network for out-of-distribution samples.
Figure 28:
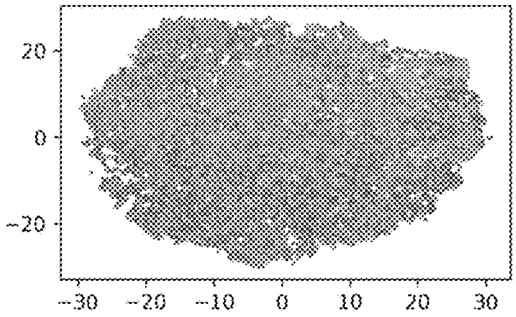
Figure 28:
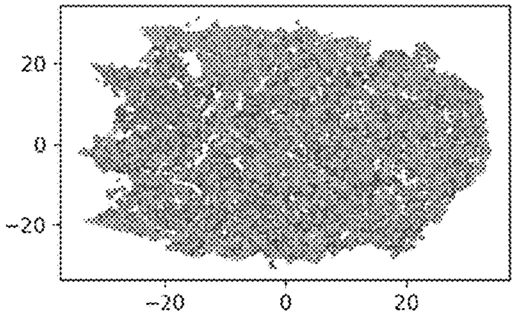
Figure 28:
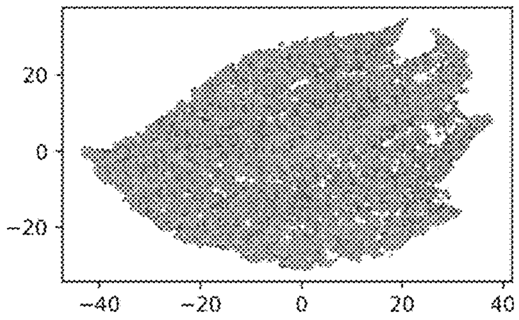
Figure 29A:
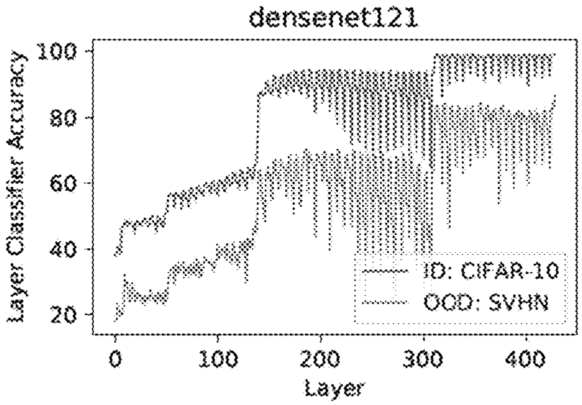
FIGS. 29A and 29B are charts illustrating examples of layer classifier accuracy for DenseNet.
Figure 29B:
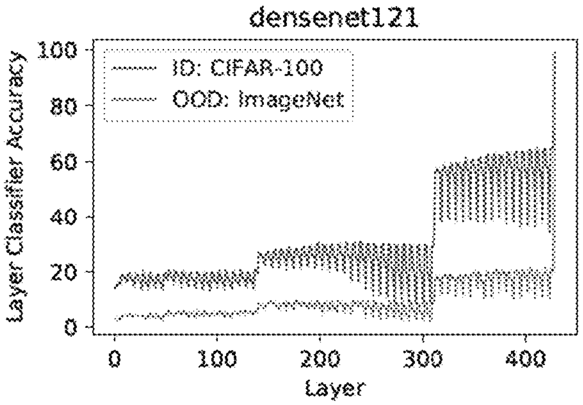
Figure 29C:
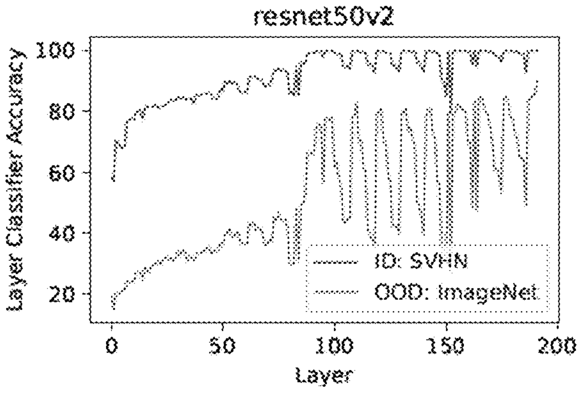
FIGS. 29C and 29D are charts illustrating examples of layer classifier accuracy for ResNet.
Figure 29D:
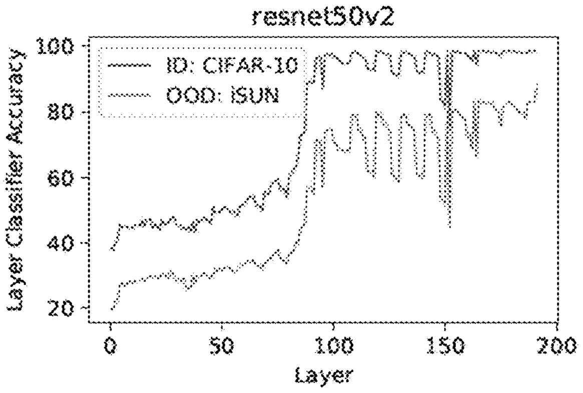

DCNN's layers have particular activity patterns for ID inputs and these patterns are becoming more specific and distinguishable as the input is processed. As can be seen in the examples of FIGS. 25 and 26, DCNNs' layers pattern gradually, by increasing a layer's order, consist of more separable patterns for an ID dataset class. FIG. 25 shows an example for DenseNet's layers output for a CIFAR-10 training dataset (ID dataset) and FIG. 26 shows the same for a ResNet trained on SVHN dataset. As can be seen in the examples of FIGS. 27 and 28, the output of these layers can be completely different and erratic for OOD samples. The differences between ID and OOD input patterns on different layers can be used to detect OOD and adversarial examples. Using t-SNE embedding, FIG. 27 illustrates an example of an output of DCNN layers for ID samples and FIG. 28 illustrates the same for OOD samples. As can be seen from the top row, ID samples form an obviously distinguishable pattern compared with OOD samples.

As can be seen from FIGS. 27 and 28, there are distinguishable patterns for ID samples operated on by the layers of the DCNN because the DCNN has been trained with ID samples. In order to learn each layer's patterns, the model employed by the machine learning module 520 can include a collection of, L, Local Classifiers (LC) ($\{LC_i, i=1 \text{ to } L\}$); which L is the number DCNN layers. Each $LC_i$ is responsible to learn the output pattern of $i^{th}$ layer ($f_{L_i}$) for an ID training dataset. After the DCNN is trained with the ID dataset, ID samples can be fed into the DCNN and an output dataset, $DS_{L_i}$, can be collected. $DS_{L_i}$ is equalvent to $f_{L_i}$ for ID inputs. $LC_i$ can then be trained with $DS_{L_i}$. In an example, a Random Forest classification can be used; however, other approaches can be used, such as Decision Tree and Quadratic Discriminant Analysis.

In some cases, each $LC_i$ can generate two different predictive labels for inputted samples. The first output is a label $l_{LC_i} \in$ {ID dataset Classes}. For example, when the DCNN is trained with CIFAR-10 dataset, $l_{LC_i} \in \{1, 2, \ldots, 10\}$. The second output is a probability for $l_{LC_i}$, denoted as $$prob_{l_{LC_i}},$$

that demonstrates to what extent $LC_i$ has certainty for generating the $l_{LC_i}$. The probability $$prob_{l_{LC_i}}$$

is generally a decimal number in [0,1]. For an inputted sample, two sequences of $$\{l_{LC_i}, i = 1, \ldots, L\}\{prob_{l_{LC_i}}, i = 1, \ldots, L\}$$

can be passed to a subsequent stage.

In a particular example, the sequences in this stage can be generated using the following:

```
Receive DCNN model, ID_train
Train DCNN with ID_train
Set LocalPatternClassifiers={ }
Set L= Number of DCNN's Layers
For i = 1 to L, do:
   Set temp_ds = [ ]
   For X_ID in ID_train, do:
      Append f_Li(X_ID, θ_Li) to temp_ds
   End for
   LC_i = Train a classifier with temp_ds
   append LC_i to LocalPatternClassifiers
End for
Set LayerPatternLabel = { }
Set LayerPatternProbability = { }
For i = 1 to L, do:
   For X_ID in ID_train, do:
      l_LCi= LC_i (f_Li(X_ID, θ_Li))
      append l_LCi to LayerPatternLabel
      prob_l_LCi , = p(LC_i(f_Li(X_ID, θ_Li))|l_LCi
```

-continued

Append $prob_{l_{LC_i}}$, to LayerPatternProbability
End for
End for
Output LayersPatternLabe andLayersPatternProbability The outputs of the above are two datasets of size N*L, which N is the size of $ID_{train}$ and L is the number of layers of the DCNN. The first dataset is LayersPatternLabel, which includes a sequence of layers that are assigned a pattern label for $ID_{train}$'s samples. The second dataset LayersPatternProbability includes a probability (i.e., certainty) of the assigned label.

In order to evaluate performance of local classifiers, accuracy of these classifiers can be examined for ID, OOD, and adversarial examples. Particularly, after $LC_i$ classifiers are trained with the output of the layers of the DCNN for the ID dataset. In an example, the performance can be evaluated by Equation (9), where N is $|X|=|\{X_{ID}, X_{OOD}\}|$. This equation provides an accuracy of the classifiers to function similar to the DCNN.

$$\text{Accuracy}_{LC_i} = \frac{\sum_{j=0}^{N} LC_i\left(f_{L_i}(X_j, \theta_{L_i})\right) == y_{DCNN}(X_j)}{N} \tag{9}$$

FIGS. 29A to 29D are charts illustrating examples of Accuracy LC; for DenseNet and ResNet. As can be seen in FIGS. 29A to 29D, there is higher accuracy for ID samples in comparison with OOD samples. It means that outputs of $LC_i$s and DCNN for ID inputs are largely congruent compared with OOD examples, which can be used to identify OOD input. Additionally, there is an increase of accuracy in final layers.

In the second stage, using the output from the first stage, the model employed by the machine learning module 520 learns patterns for the sequence of layers for ID samples. In some cases, two Decision Trees classifiers can be used to learn the patterns for the sequence of layers; however, any suitable approach can be used, such as support vector machine and NaiveBayes. These classifiers can be referred to as a Sequence Pattern Classifier (SPC).

The first pattern classifier is $SPC_{class}$, which learns from LayersPatternLabel. $SPC_{class}$ is responsible to identify a sequence of assigned labels for ID samples. The machine learning module 520 can train $SPC_{class}$ with LayersPatternLabel as training data, while labels can belong to the class labels of $ID_{train}$. $SPC_{class}$ learns the relationship between a sequence of assigned patterns generated by $LC_i$ and associated true labels. Similarly, the model employed by the machine learning module 520 can include $SPC_{probability}$, which is trained on LayersPatternProbability. $SPC_{probability}$ identifies connections between a probability for sequences of $LC_i$s (i.e., certainty of classifier) and an associated true class label (i.e., a label for input in the training dataset). At the second stage, for each inputted sample to DCNN, two predicted labels will be outputted, $Label_{class}$ and $Label_{probability}$ generated by $SPC_{class}$ and $SPC_{probability}$, respectively.

The sequence of assigned labels for ID samples can be patterns that are learned from training datasets. In this way, sequences of layers that are output by the system from an inputted sample can be compared to the learned patterns (i.e., the sequences) from the training dataset. Advantageously, this allows for the use of a combination of the layer's assigned labels and the probability that the assigned labels generate higher OOD detection rate. This combination can thus be used to predict the outputted labels, $Label_{class}$ and $Label_{probability}$; where $Label_{probability}$ is the label generated in the second stage based on the sequence for the probability in the previous stage. In this way, in the first stage, the machine learning module 520 generates a sequence of labels and a sequence of probabilities, and in the second stage, the machine learning module 520 generates output labels, $Label_{class}$ and $Label_{probability}$, for these two sequences.

The decision module 522 can then compare $Label_{class}$ and $Label_{probability}$ to $Label_{DCNN}$ to determine similarity, and thus, whether to accept a sample. Using the labels $Label_{class}$ and $Label_{probability}$ assigned by the SPC classifiers, the decision module 522 determines whether to accept or reject the output of the DCNN. The decision module 522 can use a logical expression to make such determination. If $Label_{class}$ and $Label_{probability}$ are as same as the assigned label of the DCNN, the sample is accepted, and otherwise, it is rejected as an OOD or adversarial sample. In a particular example, the decision module 522 can make the determination according to the following approach:

Receive a DCNN model trained on $ID_{train}$, $x_{input}$
Set $Label_{DCNN}$= DCNN's output for $x_{input}$
Using the output of the DCNN layers, prepare $\{l_{LC_i}\}$ and $\{prob_{l_{LC_i}}\}$ for $x_{input}$
Feed $\{l_{LC_i}\}$ into $SPC_{class}$ and generate $Label_{class}$
Feed $\{prob_{l_{LC_i}}\}$ into $SPC_{probability}$ and generate $Label_{probability}$
If $Label_{DCNN} == Label_{class}$ then
  If $Label_{DCNN} == Label_{probability}$ then
    $Label_{final}$ = accept
  Else
    $Label_{final}$ = reject
  End if
Else
  $Label_{final}$ = reject
End If
Output $Label_{final} \in$ {accept,reject}

Similar to the example experiments performed on system 100, example experiments were performed on the system 500 to verify the substantial advantages provided by the system 500. Two DCNN architectures were employed, namely ResNet and DenseNet, to evaluate performance in detecting OOD and adversarial examples. The DCNNs were trained with three different benchmark ID datasets, namely CIFAR-10, CIFAR-100 and SVHN as ID datasets. In terms of OOD datasets, three different datasets were used to provide OOD examples, as well as to generate adversarial examples, namely LSUN, iSUN and Tiny ImageNet. However, any ID dataset that the DCNN is not trained with can be considered an OOD dataset. Table 6 shows determined accuracy of DCNNs after being trained with the corresponding ID datasets (epochs=100, batch size=128).

TABLE 6

| DCNN Model | Training (ID) Dataset | Accuracy (%) |
|---|---|---|
| ResNet | CIFAR-10 | 99.68 |
| | CIFAR-100 | 98.95 |
| | SVHN | 99.68 |
| DenseNet | CIFAR-10 | 99.31 |
| | CIFAR-100 | 90.45 |
| | SVHN | 99.79 |

In the example experiments, the model was trained with test portions of the ID datasets training data. A given multi-class dataset $ID_{train}=\{(X_i, y_i)|i=1, \ldots, n\}$ and $X_i \in \mathbb{R}^n$ and $y_i \in \{c_1, \ldots, c_k\}$ was considered. The DCNN was trained by $ID_{train}$ during training time, and is expected to accept $X_{ID}$ inputs drawn from $ID_{train}$ data during test/operational/inference time. Moreover, $X_{OOD}$ denotes an unknown example that does not belong to $ID_{train}$ distribution(s); which can be considered as the $c_{k+1}$ class label (rejection class).

From an OOD detection point of view, and during the training time, a particular objective of the system 500 was to train a DCNN model that outputs high and correct confidence score for $X_{ID}$. Also, during the inference time, the DCNN's outcome should be high and correct for $X_{ID}$S, and $X_{OOD}$s should be assigned equally same and low confidence scores for all classes as formulated below:

$$\hat{y} = \begin{cases} t = \arg\max_k(\text{confidence scores}) \text{ if } conf_t \geq \delta \\ \text{reject if } KL\left([conf_1, \ldots, conf_k], \left[\frac{1}{k}, \ldots, \frac{1}{k}\right]\right) \approx 1 \end{cases} \tag{10}$$

Where δ is a threshold for making a decision on the inputted sample's class label. KL is referring to Kullback-Leibler divergence; which is a statistical measurement to calculate similarity between two distributions of data.

$$\left[\frac{1}{k}, \ldots, \frac{1}{k}\right]$$

indicates uniform distribution for k numbers and $$KL\left([conf_1, \ldots, conf_k], \left[\frac{1}{k}, \ldots, \frac{1}{k}\right]\right) = 1$$

means that DCNN's confidence scores are identical. For example, for k=4, the model's output for an OOD example is expected to be $$\left[\frac{1}{4}, \frac{1}{4}, \frac{1}{4}, \frac{1}{4}\right].$$

However, a substantial problem for DCNN is $$KL\left([conf_1, \ldots, conf_k], \left[\frac{1}{k}, \ldots, \frac{1}{k}\right]\right) \approx 0$$

even for OOD inputs.

In order to evaluate performance of the model, 24 different experiments were performed, using a combination of DCNN Model, ID dataset, and OOD dataset; as shown in Table 7. For example, <ResNet, CIFAR-10, LSUN> indicates that the example experiments included a ResNet model which is trained on CIFAR-10 dataset and OOD examples are drawn from the LSUN dataset. During the example experiments, the system 500 outperformed existing approaches in detecting OOD samples in 16 out of 24 experiments.

In addition, although the system 500 did not, in these experiments, outperform experiments that include ID=SVHN, the results of the system 500 were substantially comparable. Further, the system's 500 performance in all experiments was consistently higher than 95%, while other approaches failed to achieve such consistency. In terms of TNR, at TPR95%, the system 500 achieved 99.09%±0.64, while other approaches performed at 49.18±24.29, 69.07±20.03; which is a substantial improvement.

Table 7 illustrates a comparison of OOD detection performance in the example experiments for different OOD detection approaches, namely Baseline, ODIN, Mahalanobis, Gram Matrix, and the system 500.

TABLE 7

| In-dist (model) | OOD | TNR at TPR 95% | AUROC | Detection Accuracy |
|---|---|---|---|---|
| | | Baseline/ODIN/Mahalanobis/Gram Matrix/System 500 | | |
| CIFAR-10 (ResNet) | iSUN | 44.6/73.2/97.8/99.3/99.6 | 91.0/94.0/99.5/99.8/99.9 | 85.0/86.5/96.7/98.1/98.9 |
| | LSUN (R) | 49.8/82.1/98.8/99.6/99.9 | 91.0/94.1/99.7/99.9/99.9 | 85.3/86.7/97.7/98.6/98.9 |
| | TinyImgNet (R) | 41.0/67.9/97.1/98.7/99.2 | 91.0/94.0/99.5/99.7/99.9 | 85.1/86.5/96.3/97.8/98.5 |
| | SVHN | 50.5/70.3/87.8/97.6/98.8 | 89.9/96.7/99.1/99.5/99.9 | 85.1/91.1/95.8/96.7/98.9 |
| CIFAR-100 (ResNet) | iSUN | 16.9/45.2/89.9/94.8/99.8 | 75.8/85.5/97.9/98.8/99.9 | 70.1/78.5/93.1/95.6/100 |
| | LSUN (R) | 18.8/23.2/90.9/96.6/99.8 | 75.8/85.6/98.2/99.2/99.9 | 69.9/78.3/93.5/96.7/100 |
| | TinyImgNet (R) | 20.4/36.1/90.9/94.8/99.8 | 77.2/87.6/98.2/98.9/99.9 | 70.8/80.1/93.3/95.0/100 |
| | SVHN | 20.3/62.7/91.9/80.8/99.8 | 79.5/93.9/98.4/96.0/99.9 | 73.2/88.0/93.7/89.6/100 |
| SVHN (ResNet) | iSUN | 77.1/79.1/99.7/99.4/98.5 | 92.2/91.4/99.8/99.8/98.3 | 89.7/89.2/98.3/98.1/95.6 |
| | LSUN (R) | 74.3/77.3/99.9/99.6/98.6 | 91.6/89.4/99.9/99.8/98.5 | 89.0/87.2/99.5/98.5/95.7 |
| | TinyImgNet (R) | 79.0/82.0/99.9/99.3/98.6 | 93.5/92.0/99.9/99.7/98.5 | 90.4/89.4/99.1/97.9/95.7 |
| | CIFAR-10 | 78.3/79.8/98.4/85.8/98.6 | 92.9/92.1/99.3/97.3/98.6 | 90.0/89.4/96.9/92.0/95.7 |

TABLE 7-continued

| In-dist (model) | OOD | TNR at TPR 95% | AUROC | Detection Accuracy |
|---|---|---|---|---|
| | | Baseline/ODIN/Mahalanobis/Gram Matrix/System 500 | | |
| CIFAR-10 (DenseNet) | iSUN | 62.5/93.2/95.3/99.0/99.8 | 94.7/98.7/98.9/99.8/99.9 | 89.2/94.3/95.2/97.9/99.9 |
| | LSUN (R) | 66.6/96.2/97.2/99.5/99.8 | 95.4/99.2/99.3/99.9/99.9 | 90.3/95.7/96.3/98.6/99.9 |
| | TinyImgNet (R) | 58.9/92.4/95.0/98.8/99.8 | 94.1/98.5/98.8/99.7/99.9 | 88.5/93.9/95.0/97.9/99.9 |
| | SVHN | 40.2/86.2/90.8/96.1/99.8 | 89.9/95.5/98.1/99.1/99.9 | 83.2/91.4/93.9/95.9/99.9 |
| CIFAR-100 (DenseNet) | iSUN | 14.9/37.4/87.0/95.9/98.9 | 69.5/84.5/97.4/99.0/99.7 | 63.8/76.4/92.4/95.6/100 |
| | LSUN (R) | 17.6/41.2/91.4/97.2/98.9 | 70.8/85.5/98.0/99.3/99.7 | 64.9/77.1/93.9/96.4/100 |
| | TinyImgNet (R) | 17.6/42.6/86.6/95.7/98.9 | 71.7/85.2/97.4/99.0/99.7 | 65.7/77.0/92.2/95.5/100 |
| | SVHN | 26.7/70.6/82.5/89.3/98.9 | 82.7/93.8/97.2/97.3/99.7 | 75.6/86.6/91.5/92.4/100 |
| SVHN (DenseNet) | iSUN | 78.3/82.2/99.9/99.4/98.0 | 94.4/94.7/99.9/99.8/98.2 | 89.6/89.7/99.2/98.3/96.5 |
| | LSUN (R) | 77.1/81.1/99.9/99.5/98.2 | 94.1/94.5/99.9/99.8/98.5 | 89.1/89.2/99.3/98.6/96.6 |
| | TinyImgNet (R) | 79.8/84.1/99.9/99.1/98.2 | 94.8/95.1/99.9/99.7/98.4 | 90.2/90.4/98.9/97.9/96.5 |
| | CIFAR-10 | 69.3/71.7/96.8/80.4/98.1 | 91.9/91.4/98.9/95.5/98.4 | 86.6/85.8/95.9/89.1/96.5 |
| | Average | 78.3/82.2/99.9/99.4/98.0 ±0.13/±0.12/±0.9/±1.4/±1.0 | 94.4/94.7/99.9/99.8/98.2 ±1.4/±94.7/±99.9/±99.8/±98.2 | 89.6/89.7/99.2/98.3/96.5 ±89.6/±89.7/±99.2/±98.3/±96.5 |

For a DCNN classifier F(x, θ), an objective of an adversarial attack can be formulated as F(x', θ)≠F(x, θ), where x' is an adversarial example with a different predicted label compared with the original example x. The general approach of an adversarial attack is exemplified in Equation (11).

$$x_{adv} = x_0 + \epsilon \frac{\partial}{\partial x} J(y, F(x, \theta)) \tag{11}$$

For an adversarial attack scenario, ϵ controls the magnitude of the perturbation. In other approaches, initial input $x_0$ is generally drawn from $ID_{train}$. However, generating adversarial examples from $X_{OOD}$ data can cause more serious adversarial examples in terms of bypassing a DL model.

In order to generate adversarial examples for the example experiments, FGSM and PGD attacks were run against the DCNNs. 100 adversarial examples were generated for each ϵ value (ϵ∈{0.0001, 0.001, 0.01, 0.1, 0.5, 1}) which resulted in a total of 28,800 adversarial examples. Table 8 shows model robustness when initial examples of attacks are drawn from ID dataset and also when initial examples are drawn from OOD dataset. It is evident that samples initiated from an OOD dataset obtain higher evasion rate. Table 8 illustrates DCNNs robustness against different adversarial attack settings.

TABLE 8

| | | Adversarial Robustness | | | | | | | | | | | | |
|---|---|---|---|---|---|---|---|---|---|---|---|---|---|---|
| | | Attack = FGSM | | | | | | Attack = PGD | | | | | | |
| Model, Train Data | Source | ϵ = .0001 | ϵ = .001 | ϵ = .01 | ϵ = .1 | ϵ = .5 | ϵ = 1 | ϵ = .0001 | ϵ = .001 | ϵ = .01 | ϵ = .1 | ϵ = .5 | ϵ = 1 | Avg. |
| Resnet, CIFAR-10 | CIFAR-10 | 100 | 100 | 100 | 100 | 96 | 87 | 100 | 100 | 100 | 100 | 98 | 90 | 97.5 |
| | SVHN | 100 | 100 | 100 | 88 | 53 | 10 | 100 | 100 | 100 | 85 | 59 | 14 | 75.7 |
| | iSUN | 100 | 100 | 99 | 94 | 56 | 32 | 100 | 100 | 100 | 89 | 44 | 23 | 78.0 |
| | LSUN | 100 | 99 | 98 | 84 | 59 | 40 | 100 | 100 | 100 | 83 | 53 | 38 | 79.5 |
| | CIFAR-100 | 100 | 100 | 100 | 95 | 68 | 37 | 100 | 100 | 100 | 98 | 77 | 43 | 84.8 |
| | ImageNet | 100 | 100 | 100 | 95 | 64 | 37 | 100 | 100 | 100 | 94 | 82 | 62 | 86.1 |
| Resnet, SVHN | SVHN | 100 | 100 | 100 | 94 | 94 | 90 | 100 | 100 | 100 | 91 | 91 | 90 | 95.8 |
| | CIFAR-10 | 100 | 100 | 95 | 92 | 66 | 37 | 100 | 100 | 90 | 89 | 74 | 28 | 80.9 |
| | iSUN | 100 | 100 | 100 | 90 | 70 | 41 | 100 | 100 | 100 | 96 | 66 | 46 | 84.0 |
| | LSUN | 100 | 100 | 100 | 83 | 51 | 14 | 100 | 100 | 100 | 76 | 68 | 60 | 79.3 |
| | ImageNet | 100 | 100 | 94 | 93 | 43 | 35 | 100 | 100 | 98 | 98 | 44 | 40 | 78.7 |
| | CIFAR-100 | 100 | 100 | 92 | 86 | 56 | 35 | 100 | 100 | 97 | 96 | 45 | 24 | 77.5 |
| Resnet, CIFAR-100 | CIFAR-100 | 100 | 100 | 100 | 100 | 100 | 100 | 100 | 100 | 100 | 100 | 100 | 100 | 100 |
| | SVHN | 100 | 100 | 100 | 89 | 55 | 30 | 100 | 100 | 100 | 99 | 65 | 19 | 79.7 |
| | iSUN | 100 | 100 | 100 | 56 | 4 | 0 | 100 | 100 | 100 | 11 | 1 | 0 | 56 |
| | LSUN | 100 | 100 | 75 | 74 | 71 | 71 | 100 | 100 | 89 | 89 | 88 | 88 | 87.0 |
| | CIFAR-10 | 100 | 100 | 100 | 83 | 47 | 31 | 100 | 100 | 100 | 87 | 36 | 32 | 76.3 |
| | ImageNet | 100 | 100 | 100 | 100 | 73 | 68 | 100 | 100 | 100 | 100 | 92 | 90 | 93.5 |
| Densenet, CIFAR-10 | CIFAR-10 | 100 | 100 | 100 | 100 | 99 | 57 | 100 | 100 | 100 | 100 | 100 | 45 | 91.7 |
| | SVHN | 100 | 100 | 100 | 100 | 2 | 0 | 100 | 100 | 100 | 100 | 0 | 0 | 66.8 |
| | iSUN | 100 | 100 | 100 | 100 | 61 | 61 | 100 | 100 | 100 | 100 | 86 | 86 | 91.1 |
| | LSUN | 100 | 100 | 100 | 100 | 100 | 1 | 100 | 100 | 100 | 100 | 99 | 0 | 83.3 |
| | CIFAR-100 | 100 | 100 | 100 | 97 | 93 | 80 | 100 | 100 | 100 | 99 | 98 | 85 | 96 |
| | ImageNet | 100 | 100 | 100 | 100 | 24 | 23 | 100 | 100 | 100 | 100 | 10 | 10 | 72.5 |
| Densenet, SVHN | SVHN | 100 | 100 | 100 | 100 | 100 | 90 | 100 | 100 | 100 | 100 | 100 | 100 | 99.1 |
| | CIFAR-10 | 100 | 100 | 100 | 95 | 10 | 9 | 100 | 100 | 100 | 100 | 4 | 3 | 68.4 |
| | iSUN | 100 | 100 | 100 | 100 | 100 | 100 | 100 | 100 | 100 | 100 | 100 | 100 | 100 |
| | LSUN | 100 | 100 | 100 | 100 | 100 | 0 | 100 | 100 | 100 | 100 | 100 | 0 | 83.3 |
| | ImageNet | 100 | 100 | 100 | 100 | 96 | 96 | 100 | 100 | 100 | 100 | 99 | 99 | 99.1 |
| | CIFAR-100 | 100 | 100 | 100 | 92 | 85 | 0 | 100 | 100 | 100 | 97 | 0 | 0 | 72.8 |

TABLE 8-continued

| | | Adversarial Robustness | | | | | | | | | | | | |
|---|---|---|---|---|---|---|---|---|---|---|---|---|---|---|
| | | Attack = FGSM | | | | | | Attack = PGD | | | | | | |
| Model, Train Data | Source | ϵ = .0001 | ϵ = .001 | ϵ = .01 | ϵ = .1 | ϵ = .5 | ϵ = 1 | ϵ = .0001 | ϵ = .001 | ϵ = .01 | ϵ = .1 | ϵ = .5 | ϵ = 1 | Avg. |
| Densenet, CIFAR-100 | CIFAR-100 | 100 | 100 | 100 | 100 | 100 | 74 | 100 | 100 | 100 | 100 | 100 | 74 | 95.6 |
| | SVHN | 100 | 100 | 100 | 100 | 1 | 1 | 100 | 100 | 100 | 100 | 0 | 0 | 66.8 |
| | iSUN | 100 | 100 | 100 | 99 | 0 | 0 | 100 | 100 | 100 | 100 | 0 | 0 | 66.5 |
| | LSUN | 100 | 100 | 100 | 100 | 100 | 0 | 100 | 100 | 100 | 100 | 100 | 0 | 83.3 |
| | CIFAR-10 | 100 | 100 | 100 | 99 | 21 | 0 | 100 | 100 | 100 | 100 | 13 | 0 | 69.41 |
| | ImageNet | 100 | 100 | 100 | 98 | 0 | 0 | 100 | 100 | 100 | 100 | 0 | 0 | 66.5 |

The system's 500 performance was evaluated for detecting adversarial examples in two different settings; for transferable adversarial examples and non-transferable adversarial examples. For example, for a non-transferable adversarial example, it was assumed there are adversarial examples that are generated for ResNet and trained with CIFAR-10. The system 500 attempted to detect them while they attack a <ResNet, CIFAR-10> setting. On the other hand, in another example, a transferable example was generated on <ResNet, CIFAR-10> but was used to attack other combinations. Table 9 shows the system's 500 detection rate for adversarial examples. As can be seen from Table 9, the system 500 achieved a very high detection rate in both non-transferable and transferable settings; with a detection rate between 98.03% and 99.6%. In addition, although adversarial attacks that originated from OOD datasets were able to fool other models due to the higher evasion rate, the system 500 was able to perform a uniform detection for ID and OOD adversarial examples.

TABLE 9

| | | Detection Rate | | | |
|---|---|---|---|---|---|
| | | Non-Transferable Setting | | Transferable Setting | |
| | | Attack = FGSM | Attack = PGD | Attack = FGSM | Attack = PGD |
| Resnet, CIFAR-10 | CIFAR-10 | 99.96 | 99.35 | 98.29 | 99.35 |
| | SVHN | 98.33 | 98.86 | 98.08 | 98.68 |
| | iSUN | 98.25 | 98.45 | 98.75 | 99.80 |
| | LSUN | 98.91 | 99.76 | 98.81 | 98.76 |
| | ImageNet | 99.52 | 98.10 | 98.93 | 98.64 |
| Resnet, SVHN | SVHN | 99.08 | 99.67 | 99.51 | 98.31 |
| | CIFAR-10 | 99.16 | 99.20 | 98.56 | 99.54 |
| | iSUN | 99.17 | 98.64 | 99.46 | 99.36 |
| | LSUN | 99.77 | 98.96 | 98.16 | 99.50 |
| | ImageNet | 99.46 | 99.50 | 98.96 | 98.80 |
| Resnet, CIFAR-100 | CIFAR-100 | 98.55 | 99.24 | 99.76 | 99.20 |
| | SVHN | 98.88 | 98.21 | 99.17 | 99.10 |
| | iSUN | 98.86 | 99.17 | 99.01 | 98.54 |
| | LSUN | 98.40 | 98.39 | 98.31 | 98.87 |
| | ImageNet | 98.67 | 98.72 | 99.00 | 98.82 |
| Densenet, CIFAR-10 | CIFAR-10 | 98.88 | 98.04 | 99.34 | 99.22 |
| | SVHN | 98.75 | 99.68 | 99.87 | 98.37 |
| | iSUN | 99.24 | 98.58 | 99.63 | 98.22 |
| | LSUN | 99.30 | 98.64 | 98.97 | 99.20 |
| | ImageNet | 99.22 | 99.38 | 99.56 | 99.38 |
| Densenet, SVHN | SVHN | 98.97 | 98.24 | 99.17 | 98.05 |
| | CIFAR-10 | 98.19 | 99.14 | 99.67 | 98.58 |
| | iSUN | 99.70 | 98.73 | 98.05 | 98.20 |
| | LSUN | 99.17 | 99.03 | 98.79 | 99.34 |
| | ImageNet | 99.74 | 99.99 | 99.12 | 98.75 |
| Densenet, CIFAR-100 | CIFAR-100 | 98.13 | 98.74 | 99.64 | 99.24 |
| | SVHN | 99.86 | 98.99 | 99.54 | 98.50 |
| | iSUN | 98.65 | 99.78 | 99.89 | 98.92 |
| | LSUN | 98.68 | 98.65 | 98.03 | 99.71 |
| | ImageNet | 98.52 | 98.63 | 98.45 | 99.21 |

As evidenced in the example experiments, the system 500 is able to provide substantial OOD and adversarial example detection; and accordingly, is able to detect malicious samples with a uniform detection approach. The results of the example experiments show very high accuracy by the system 500 for both detection objectives, OOD and adversarial example detection.

While the present disclosure generally describes the present embodiments as applied to DCNNs, it should be appreciated that the present embodiments can be applied to any suitable deep-learning architecture; for example, artificial neural networks that perform natural language processing and malware detection.

The presently disclosed embodiments can be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description and all changes which come within the meaning and range of equivalency of the claims are therefore intended to be embraced therein.

The invention claimed is:

1. A computer-implemented method for counteracting an adversarial attack on an artificial neural network by determining out-of-distribution samples, the method comprising:

- receiving training data for the artificial neural network comprising a plurality of in-distribution samples in an input space;
- embedding the training data in the input space into a lower-dimensional embedded space having fewer dimensions than the input space using a manifold embedding;
- receiving one or more inputted samples and embedding the one or more inputted samples into the lower-dimensional embedded space;
- determining a score for each of the one or more inputted samples by determining a distance from each inputted sample to a distribution of the training data in the lower-dimensional embedded space;
- classifying whether each of the one or more inputted samples is out-of-distribution by determining whether the score is greater than a predetermined distance from the distribution of the training data in the lower-dimensional embedded space; and
- outputting the classification of each of the one or more inputted samples.

2. The method of claim 1, wherein the artificial neural network is Deep Convolutional Neural Network (DCNN).

3. The method of claim 1, wherein determining the score comprises performing Expectation Maximization (EM).

4. The method of claim 1, wherein the score comprises a weighted confidence score.

5. The method of claim 3, further comprising optimizing the input space by determining areas of the input space vulnerable to out-of-distribution samples using the weighted confidence score.

6. The method of claim 4, wherein performing the optimization to identify out-of-distribution areas comprises performing particle swarm optimization.

7. The method of claim 1, wherein embedding the training data in the input space into the lower-dimensional embedded space comprises embedding in-distribution samples into a lower-dimensional manifold using one or more of Isometric Mapping ("Isomap") and Locally Linear Embedding ("LLE").

8. A system for counteracting an adversarial attack on an artificial neural network by determining out-of-distribution samples, the system comprising a processing unit in communication with a data storage to receive stored instructions to:

- receive, at the processing unit, training data for the artificial neural network comprising a plurality of in-distribution samples in an input space and to receive one or more inputted samples;
- embed, by the processing unit, the training data in the input space into a lower-dimensional embedded space and embed the one or more inputted samples into the lower-dimensional embedded space having fewer dimensions than the input space using a manifold embedding;
- determine, by the processing unit, a score for each of the one or more inputted samples by determining a distance from each inputted sample to a distribution of the training data in the lower-dimensional embedded space, and to classify whether each of the one or more inputted samples is out-of-distribution by determining whether the score is greater than a predetermined distance from the distribution of the training data in the lower-dimensional embedded space; and
- output, by the processing unit, the classification of each of the one or more inputted samples.

9. The system of claim 8, wherein the artificial neural network is Deep Convolutional Neural Network (DCNN).

10. The system of claim 8, wherein determining the score comprises performing Expectation Maximization (EM).

11. The system of claim 8, wherein the score comprises a weighted confidence score.

12. The system of claim 10, wherein the processing unit further receives stored instructions to optimize the input space by determining areas of the input space vulnerable to out-of-distribution samples using the weighted confidence score.

13. The system of claim 11, wherein performing the optimization to identify out-of-distribution areas comprises performing Particle Swarm Optimization.

14. The system of claim 8, wherein embedding the training data in the input space into the lower-dimensional embedded space comprises embedding in-distribution samples into a lower-dimensional manifold using one or more of Isometric Mapping ("Isomap") and Locally Linear Embedding ("LLE").

15. A computer-implemented method for counteracting an adversarial attack on an artificial neural network by determining out-of-distribution samples, the method comprising:

- receiving an input sample;
- passing the input sample through the artificial neural network to retrieve outputs from a plurality of layers of the artificial neural network;
- passing the outputs of the layers of the artificial neural network to one or more first-stage classifiers to predict similarity of the outputs to a learned activity pattern for in-distribution samples from a training dataset, the first-stage classifiers outputting, in layer order, a sequence of labels and a sequence of probabilities, each sequence having an element corresponding to a respective layer output;
- passing the sequence of labels and the sequence of probabilities to one or more second-stage classifiers, comprising sequence-pattern classifiers, to determine a class output label and a probability output label; and
- comparing the prediction of the artificial neural network for the input sample to the class output label and the probability output label to determine whether the sample is out-of-distribution, and where the predictions are the same, outputting a classification of the sample as in-distribution, and otherwise, outputting a classification of the sample as out-of-distribution.

16. The method of claim 15, wherein the one or more second-stage classifiers comprise sequence pattern classifiers.

17. The method of claim 15, wherein the artificial neural network comprises a random forest classifier.

18. The method of claim 15, wherein the learned activity patterns comprise sequences in the training dataset.

19. The method of claim 15, wherein the sequence of labels comprises a classification of learned labels for each in-distribution sample and associated true class label in the training dataset, and wherein the sequence of probabilities comprises a learned probability for sequences certainty of classification and the associated true class label.

20. The method of claim 15, wherein the artificial neural network comprises a set of local classifiers for each layer in the artificial neural network.

* * * * *